United States Patent
Digonnet et al.

(10) Patent No.: US 11,131,547 B2
(45) Date of Patent: Sep. 28, 2021

(54) GAIN-COUPLED RESONATOR GYROSCOPE

(71) Applicant: The Board of Trustees of the Leland Stanford Junior University, Palo Alto, CA (US)

(72) Inventors: Michel J. F. Digonnet, Palo Alto, CA (US); Matthew James Grant, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 16/746,696

(22) Filed: Jan. 17, 2020

(65) Prior Publication Data
US 2020/0249023 A1    Aug. 6, 2020

Related U.S. Application Data

(60) Provisional application No. 62/800,149, filed on Feb. 1, 2019.

(51) Int. Cl.
*G01C 19/72*      (2006.01)
(52) U.S. Cl.
CPC ........... *G01C 19/723* (2013.01); *G01C 19/72* (2013.01); *G01C 19/722* (2013.01)
(58) Field of Classification Search
CPC .... G01C 19/723; G01C 19/72; G01C 19/722; G01C 19/64
See application file for complete search history.

(56) References Cited

U.S. PATENT DOCUMENTS

2013/0088720 A1*   4/2013   Sorrentino ............ G01C 19/64
                                                                356/460
2018/0252527 A1    9/2018   Mercedeh et al.

OTHER PUBLICATIONS

Grant et al., "Double-ring optical resonator gyroscopes using 3×3 fiber couplers", Proceedings of SPIE, vol. 10548 105480S-11, dated Feb. 22, 2018, in 11 pages.

(Continued)

*Primary Examiner* — Jonathan M Hansen
(74) *Attorney, Agent, or Firm* — Knobbe, Martens, Olson & Bear, LLP

(57) ABSTRACT

A gyroscope includes a first optical resonator in optical communication with at least one optical waveguide and a second optical resonator in optical communication with the first optical resonator. One of the first optical resonator and the second optical resonator has a power loss rate L greater than zero and the other of the first optical resonator and the second optical resonator has a power gain rate G greater than zero. The at least one optical waveguide, the first optical resonator, and the second optical resonator are configured to be below lasing threshold. The gyroscope further includes at least one optical detector in optical communication with the at least one optical waveguide, and the at least one optical waveguide is configured to receive, from at least one light source, light having an input power $P_{in}$ at a frequency $\omega_p$ and to transmit at least a portion of the light having an output power $P_{out}$ to the at least one optical detector.

19 Claims, 22 Drawing Sheets

(56) References Cited

OTHER PUBLICATIONS

International Search Report and Written Opinion, re PCT Application No. PCT/US2020/014768, dated Sep. 4, 2020.

Terrel et al., "Performance comparison of slow-light coupled-resonator optical gyroscopes", Laser & Photonics Reviews, vol. 3, No. 5, dated Sep. 1, 2009, pp. 453-465.

Aghaie et al., "Effect of periodic modulation of the coupling ratios on the sensitivity of a CROW gyroscope," Journal of the Optical Society of America B, vol. 32, Issue No. 6, p. 1120, 2015.

Aghaie et al., "Sensitivity limit of a coupled-resonator optical waveguide gyroscope with separate input/output coupling," Journal of the Optical Society of America B, vol. 32, Issue No. 2, pp. 339-344, Feb. 2015.

Assawaworrarit et al., "Robust wireless power transfer using a nonlinear parity-time-symmetric circuit," Nature, vol. 546, Issue No. 7658, pp. 387-390, Jun. 15, 2017.

Chen et al., "Exceptional points enhance sensing in an optical microcavity," Nature, vol. 548, Issue No. 7666, pp. 192-196, Aug. 10, 2017.

El-Ganainy et al., "Theory of coupled optical PT-symmetric structures," Optics Letters, vol. 32, No. 17, pp. 2632-2634, Sep. 1, 2007.

Grant et al., "Double-Ring Resonator Optical Gyroscopes," Journal of Lightwave Technology, vol. 36, Issue No. 13, pp. 2708-2715, Jul. 1, 2018.

Grant et al., "Loss-gain coupled ring resonator gyroscope," Proceedings of SPIE, Optical, Opto-Atomic, and Entanglement-Enhanced Precision Metrology, vol. 10934, pp. 109340T-1-109340T-13, Mar. 4, 2019.

Hodaei et al., "Enhanced sensitivity at higher-order exceptional points," Nature, vol. 548, Issue No. 7666, pp. 187-191, Aug. 10, 2017.

Joannopoulos et al., "Chapter 10: Designing Photonic Crystals for Applications", Photonic Crystals: Molding the Flow of Light, Second Edition, pp. 190-228, Princeton University Press, Princeton, New Jersey (2008).

Lefèvre, Nervé C., "Resonant Fiber-Optic Gyroscope (R-FOG)", The Fiber Optic Gyroscope, 2nd ed., Artech House (2014).

Peng et al., "Parity-time-symmetric whispering-gallery microcavities," Nature Physics, vol. 10, Issue No. 5, pp. 394-398, May 2014.

Ren et al., "Ultrasensitive micro-scale parity-time-symmetric ring laser gyroscope," Optics Letters, vol. 42, No. 8, pp. 1556-1559, Apr. 15, 2017.

Rüter et al., "Observation of parity-time symmetry in optics," Nature Physics, vol. 6, No. 3, pp. 192-195, Mar. 2010.

Shahriar et al., "Ultrahigh enhancement in absolute and relative rotation sensing using fast and slow light," Physical Review A, vol. 75, No. 5, pp. 053807-1-052807-10 (2007).

Sunada, Satoshi, "Large Sagnac frequency splitting in a ring resonator operating at an exceptional point," Physical Review A, vol. 96, Issue No. 3, pp. 033842-1-033842-6, 2017.

Terrel et al., "Performance comparison of slow-light coupled-resonator optical gyroscopes," Laser & Photonics Reviews, vol. 3, No. 5, pp. 452-465 (2009).

\* cited by examiner

GAIN-COUPLED RESONATOR GYROSCOPE

CLAIM OF PRIORITY

This application claims the benefit of priority to U.S. Provisional Appl. No. 62/800,149, filed Feb. 1, 2019 and incorporated in its entirety by reference herein.

BACKGROUND

Field

This application relates generally to optical gyroscopes.

Description of the Related Art

High-accuracy optical gyroscopes rely on the Sagnac effect, which produces a phase shift in the light traveling along a length of fiber that is rotated. The Sagnac phase accumulated in one round-trip through a loop of fiber is proportional to the area subtended by the loop. For the small rotation rates of interest for inertial navigation of aircraft (e.g., less than 0.01°/h), the Sagnac phase shift is very small. Fiber optic gyroscopes (FOGs) have therefore used fiber coils with a very large area subtended by a long fiber (e.g., typically 100-1000 meters and wound in multiple turns). The concomitant size, weight, and material costs disqualify FOGs for many large-volume applications where these parameters, especially compactness, are critical. Examples include, but are not limited to, inertial navigation of self-driving cars, flying vehicles, and drones.

One solution that has been extensively investigated is the use of an optical resonator to measure the Sagnac phase instead of the Sagnac interferometer used in a FOG. In such a resonator, light recirculates many times, picking up a Sagnac phase shift at each recirculation, thereby accumulating a much greater total rotation-induced phase-shift, which gives a stronger signal that is easier to measure. Resonant fiber optic gyroscopes (RFOGs) therefore utilize much shorter fibers, and can be smaller in size, but this fiber-length reduction still is not enough.

In the past decade or so, several publications have proposed enhancing the Sagnac effect by using coupled resonant optical waveguides (CROWs) (see, e.g., K. Zamani Aghaie and M. J. F. Digonnet, "Effect of periodic modulation of the coupling ratios on the sensitivity of a CROW gyroscope," *J. Opt. Soc. Am. B*, vol. 32, no. 6, p. 1120, 2015 and references therein). CROWs have multiple ring resonators that are optically coupled together in some fashion. While many of these publications have claimed quite sizable improvements in rotation sensitivity, as compared to an RFOG, several of these claims were later proven to be erroneous.

SUMMARY

In certain embodiments, a gyroscope comprises at least one optical waveguide comprising a first portion, a second portion, and a third portion, the second portion between the first portion and the third portion. The gyroscope further comprises at least one light source in optical communication with the first portion of the at least one optical waveguide. The gyroscope further comprises a first optical resonator in optical communication with the second portion of the at least one optical waveguide. The first optical resonator has an input power coupling rate $\kappa_{in}$ with the second portion of the at least one optical waveguide and having a loss rate L. The gyroscope further comprises a second optical resonator in optical communication with the first optical resonator with an inter-resonator power coupling rate $\kappa$ and having a gain rate G. The at least one optical waveguide, the first optical resonator, and the second optical resonator are configured to be below lasing threshold. The gyroscope further comprises at least one optical detector in optical communication with the third portion of the at least one optical waveguide. The at least one optical waveguide is configured to receive, from the at least one light source, probe light having an input power $P_{in}$ at a frequency $\omega_p$. The at least one optical waveguide is further configured to transmit at least a portion of the received probe light having an output power $P_{out}$ to the at least one optical detector.

In certain embodiments, a method of operating a gyroscope comprises providing a gyroscope comprising at least one optical waveguide comprising a first portion, a second portion, and a third portion, the second portion between the first portion and the third portion. The gyroscope further comprises at least one light source in optical communication with the first portion of the at least one optical waveguide. The gyroscope further comprises a first optical resonator in optical communication with the second portion of the at least one optical waveguide. The first optical resonator has an input coupling rate $\kappa_{in}$ with the second portion of the at least one optical waveguide. The gyroscope further comprises a second optical resonator in optical communication with the first optical resonator with an inter-resonator coupling rate $\kappa$. The at least one optical waveguide, the first optical resonator, and the second optical resonator are configured to be below lasing threshold. The gyroscope further comprises at least one optical detector in optical communication with the third portion of the at least one optical waveguide. The at least one optical waveguide is configured to receive, from the at least one light source, light having an input power $P_{in}$ at a frequency $\omega_p$. The at least one optical waveguide is further configured to transmit at least a portion of the light having an output power $P_{out}$ to the at least one optical detector. The method further comprises operating the gyroscope with a ratio $\kappa/\kappa_{EP}$ of the inter-resonator coupling rate $\kappa$ to an exceptional point inter-resonator coupling rate $\kappa_{EP}$ in a range of greater than 0.75 and less than 1.35.

In certain embodiments, a gyroscope comprises at least one optical waveguide comprising a first portion, a second portion, and a third portion, the second portion between the first portion and the third portion. The gyroscope further comprises at least one light source in optical communication with the first portion of the at least one optical waveguide. The gyroscope further comprises a first optical resonator in optical communication with the second portion of the at least one optical waveguide. The first optical resonator has an input power coupling rate $\kappa_{in}$ with the second portion of the at least one optical waveguide. The gyroscope comprises a second optical resonator in optical communication with the first optical resonator with an inter-resonator power coupling rate $\kappa$. One of the first optical resonator and the second optical resonator has a power loss rate L greater than zero and the other of the first optical resonator and the second optical resonator has a power gain rate G greater than zero. The at least one optical waveguide, the first optical resonator, and the second optical resonator are configured to be below lasing threshold. The gyroscope further comprises at least one optical detector in optical communication with the third portion of the at least one optical waveguide. The at least one optical waveguide is configured to receive, from the at least one light source, light having an input power $P_{in}$ at a frequency $\omega_p$. The at least one optical waveguide is further configured to transmit at least a portion of the light having an output power $P_{out}$ to the at least one optical detector.

DETAILED DESCRIPTION

Figure 1A:
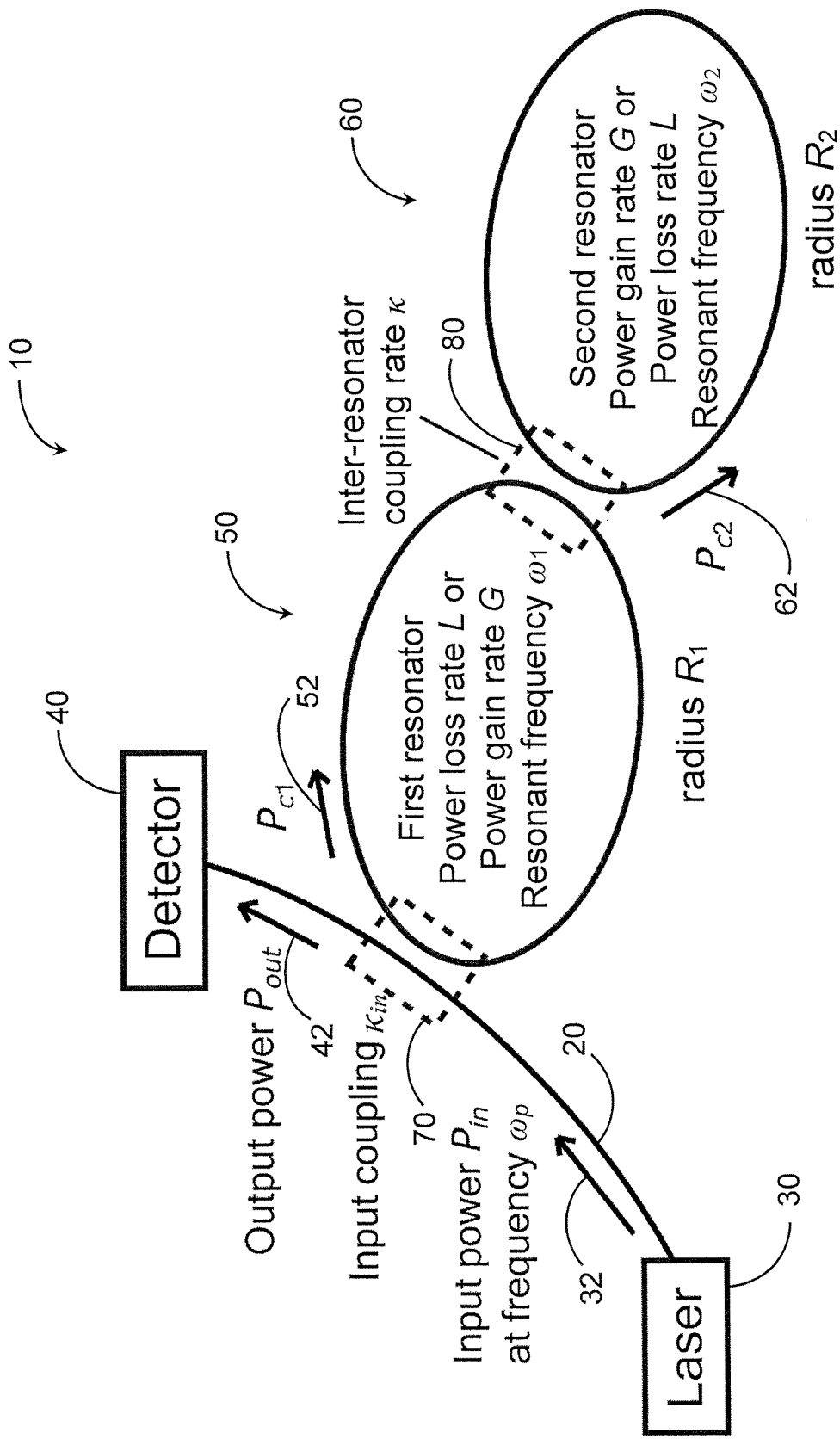
FIG. 1A schematically illustrates an example gain-coupled resonator gyroscope in accordance with certain embodiments described herein.

Coupled optical resonators with parity-time (PT) symmetry exhibit exceptional points where they become extremely sensitive to external perturbations (see, e.g., Ren et al., "Ultrasensitive micro-scale parity-time-symmetric ring laser gyroscope," Opt. Lett. Vol. 42, No. 8, pp. 1556-1559 (Apr. 15, 2017) ("Ren")) and so have gained interest in research as sensors, in particular as highly sensitive gyroscopes. In one particular physical embodiment, PT symmetry is achieved by coupling together two ring resonators, each with identical resonance frequencies, and pumping one ring such that it exhibits a gain equal to the loss of the other ring [see, e.g., B. Peng et al., "Parity-time-symmetric whispering-gallery microcavities," Nat. Phys., vol. 10, no. 5, pp. 394-398, 2014 ("Peng")].

Previous work has proposed that such an optical gyroscope operated at an exceptional point (EP) is responsive to rotations of magnitude $\Omega$ by shifting the resonant frequencies of the optical gyroscope in proportion to $\sqrt{\Omega}$, as opposed to $\Omega$, as most sensors do. When $\Omega$ is small, $\sqrt{\Omega}$ is much larger than $\Omega$, and therefore this $\sqrt{\Omega}$ response can result in a significant enhancement in the Sagnac frequency shift. Simulations have predicted that the rotation-induced resonance frequency shift due to the Sagnac effect in such a device operated as a laser can be $10^8$ times larger than that of the equivalent uncoupled, single-ring gyroscope (see, e.g., Ren). An enhancement in the Sagnac frequency shift by a factor larger than 100 over a resonant optical gyroscope has previously been predicted in an all-passive EP gyroscope comprising a ring resonator with a periodic modulation in its index of refraction (see, S. Sunada, "Large Sagnac frequency splitting in a ring resonator operating at an exceptional point," Phys. Rev. A, vol. 96, no. 3, 2017). Preliminary experiments on EP sensing have achieved second- and third-order EPs where temperature sensitivity (e.g., defined as the temperature-induced shift of resonance frequency) was enhanced by factors of 13 and 23, respectively (see, H.

Hodaei et al., "Enhanced sensitivity at higher-order exceptional points," Nature, vol. 548, no. 7666, pp. 187-191, 2017). Additionally, a loss-compensated ring resonator with two strategically placed scatterers was constructed and operated at an EP to demonstrate a factor of 2 enhancement in sensitivity to particle proximity (see, W. Chen et al., "Exceptional points enhance sensing in an optical microcavity," Nature, vol. 548, pp. 192-196, 2017).

However, as described more fully herein, the propositions made in previous work regarding such systems suffer from a number of shortcomings in their physical assumptions and characterizations. First, the sensitivity to rotation had been defined as the shift in resonance frequency, which is an incomplete definition and may not directly correlate with the sensor's precision because it fails to include others parameters that affect the actual sensitivity, namely the dependence of the output of the gyroscope (e.g., a change in detected power) on other parameters besides this frequency shift. For example, although the sensitivity does depend on this resonance frequency shift, it can also depend on other factors, such as the linewidth of the resonance, as it does in other resonant gyroscopes (e.g., RFOG), as well as gain saturation and amplified spontaneous emission (ASE) even when the device is operated below lasing threshold. In addition, as described more fully herein, the shape of the resonance peak(s) can also change under rotation for this PT-symmetric structure, and the contribution due to this change in shape can be quite significant in at least some cases. Second, as in passive coupled resonators, the rotation sensitivity for this PT-symmetric structure depends also on the readout techniques (e.g., how the change in transmission is measured in practice) used to measure these combined rotation-induced changes, in frequency and lineshape. For example, resonant optical gyroscopes only measure shifts in resonant frequency indirectly by measuring changes in detected power (see, e.g., M. Terrel et al., "Performance comparison of slow-light coupled-resonator optical gyroscopes," Laser Photonics Rev., vol. 3, no. 5, pp. 452-465, 2009; M. J. Grant and M. J. F. Digonnet, "Double-Ring Resonator Optical Gyroscopes," J. Light. Technol., vol. 36, no. 13, pp. 2708-2715, 2018; K. Zamani Aghaie and M. J. F. Digonnet, "Effect of periodic modulation of the coupling ratios on the sensitivity of a CROW gyroscope," J. Opt. Soc. Am. B, vol. 32, no. 6, pp. 1120-1124, 2015; K. Zamani Aghaie and M. J. F. Digonnet, "Sensitivity limit of a coupled-resonator optical waveguide gyroscope with separate input/output coupling," J. Opt. Soc. Am. B, vol. 32, no. 2, pp. 339-344, 2015). Some fast-light laser gyros have their resonance shift enhancement nearly cancelled out entirely by a broadening of the lasing lines induced by rotation (see, M.S. Shahriar et al., "Ultrahigh enhancement in absolute and relative rotation sensing using fast and slow light," Phys. Rev. A, vol. 75, no. 5, p. 053807, 2007). Third, the rotation-induced frequency shift when the PT-symmetric structure is operated at or near the exceptional point is exceedingly sensitive to small fluctuations of any of the structure's design parameters, in particular the coupling ratios of the input coupler and the resonator-to-resonator coupler, making it very difficult in practice to use such a device as proposed by Ren.

Certain embodiments described herein advantageously provide a compact high-sensitivity gyroscope, with sensing mechanisms or readout schemes to make it possible.

FIG. 1A schematically illustrates an example gain-coupled resonator gyroscope 10 in accordance with certain embodiments described herein. The gyroscope 10 comprises at least one optical waveguide 20 (e.g., optical fiber) comprising a first portion, a second portion, and a third portion, the second portion between the first portion and the third portion. The gyroscope 10 further comprises at least one light source 30 (e.g., probe laser; source of probe light) in optical communication with the first portion of the at least one optical waveguide 20, and at least one optical detector 40 in optical communication with the third portion of the at least one optical waveguide 20. The at least one optical waveguide 20 is configured to receive, from the at least one light source 30, light 32 (e.g., optical signals; probe light) having an input power $P_{in}$ at a frequency $\omega_p$ and to transmit at least a portion 42 of the light having an output power $P_{out}$ to the at least one optical detector 40. The at least one optical detector 40 is configured to measure a change in the output power $P_{out}$ caused by a rotation applied to the gyroscope 10.

The gyroscope 10 further comprises a first optical resonator 50 having a first resonant frequency $\omega_1$ in optical communication with the second portion of the at least one optical waveguide 20. The first optical resonator 50 has an input power coupling rate $\kappa_{in}$ with the second portion of the at least one optical waveguide 20. For example, in certain embodiments, the first optical resonator 50 comprises a first ring resonator 54 having a radius $R_1$ and an effective index $n_{eff}$ of the waveguide mode of the first ring resonator 54, and the first ring resonator 54 is optically coupled to the second portion of the at least one optical waveguide 20 by an input-output 2×2 directional coupler 70 with a power coupling ratio $K_{in}$ such that the input power coupling rate $\kappa_{in} = 2\pi R_1 n_{eff} K_{in}/c$, where c is the speed of light in vacuum. The gyroscope 10 further comprises a second optical resonator 60 having a second resonant frequency $\omega_2$ in optical communication with the first optical resonator 50. The second optical resonator 60 has an inter-resonator power coupling rate x with the first optical resonator 50. For example, in certain embodiments, the second optical resonator 60 comprises a second ring resonator 64 having a radius $R_2$ (e.g., equal to $R_1$) and an effective index $n_{eff}$ of the waveguide mode of the second ring resonator 64, and the second ring resonator 64 is optically coupled to the first ring resonator 54 by an input-output 2×2 directional coupler 80 with a power coupling ratio K such that the inter-resonator power coupling rate is $\kappa = 2\pi R_2 n_{eff} K/c$, where c is the speed of light in vacuum.

In certain embodiments, one of the first optical resonator 50 and the second optical resonator 60 has a power loss rate L greater than zero (e.g., optical power loss rate for light propagating around the optical resonator) and the other of the first optical resonator 50 and the second optical resonator 60 has a power gain rate G greater than zero (e.g., optical power gain rate for light propagating around the optical resonator). In certain embodiments, the gyroscope 10 comprises at least one excitation source (not shown in FIGS. 1A-1D) in operative communication with the one of first optical resonator 50 and the second optical resonator 60 having the power gain rate G greater than zero. For example, the at least one excitation source can comprise a light source (e.g., laser; pump laser) configured to provide optical excitation signals (e.g., pump light) and/or an electrical current source (e.g., electric power supply) configured to provide electrical excitation signals (e.g., pump electrical currents), such that the optical excitation signals and/or electrical excitation signals interact with a gain medium of the optical resonator such that the optical resonator exhibits the power gain rate G.

In certain embodiments, the at least one optical waveguide 20, the first optical resonator 50, and the second optical resonator 60 are configured to be below lasing threshold. For example, the lasing threshold corresponds to the values of the parameters of the gyroscope 10 (e.g., the gain G, the loss L, and the coupling rates κ and $\kappa_{in}$) at which, in the absence of the probe light 32, the output power $P_{out}$ as a function of the intensity of the excitation signals (e.g., optical excitation signals; electrical excitation signals) exhibits a change of slope. When the at least one optical waveguide 20, the first optical resonator 50, and the second optical resonator 60 of certain embodiments are below lasing threshold, the output power $P_{out}$ is limited to only a small amount of spontaneous emission from the gain medium (e.g., substantially no stimulated emission light is generated). In contrast, other gyroscopes have been disclosed (see, e.g., Ren) in which the gyroscope is operated above lasing threshold, such that the output power $P_{out}$ comprises a large amount of stimulated emission (e.g., the stimulated emission light is greater than the spontaneous emission light).

For example, in certain embodiments (see, e.g., FIG. 1B), the first optical resonator 50 has a power loss rate L greater than zero (e.g., optical power loss rate for light 52 propagating around the first optical resonator 50) and the second optical resonator 60 has a power gain rate G greater than zero (e.g., optical power gain rate for light 62 propagating around the second optical resonator 60). For another example, in certain other embodiments (see, e.g., FIGS. 1C and 1D), the first optical resonator 50 has a power gain rate G greater than zero (e.g., optical power gain rate for light 52 propagating around the first optical resonator 50) and the second optical resonator 60 has a power loss rate L greater than zero (e.g., optical power loss rate for light 62 propagating around the second optical resonator 60). In certain embodiments, the loss rate L accounts for all loss in the corresponding optical resonator (e.g., waveguide absorption, scattering, bending loss, coupler loss, etc.), but does not include the portion of light purposely tapped out of the optical resonator (e.g., from the input-output 2×2 directional coupler 70 or the inter-resonator 2×2 directional coupler 80). When modeling all loss L as waveguide absorption or scattering, $L=c\alpha_L/n_{eff}$, where $\alpha_L$ is the power loss coefficient of the waveguide of the optical resonator, in units of $m^{-1}$. Similarly, in certain embodiments, the gain rate G accounts for the net gain experienced by light in the corresponding optical resonator. For example, G is the power gain rate supplied by the gain mechanism to the optical resonator (e.g., stimulated emission in trivalent erbium doped in a host material such as silica) minus all intrinsic waveguide losses of the optical resonator (e.g., waveguide absorption, scattering, bending loss, coupler loss, etc.). When modeling the gain G as the light experiencing exponential growth as it propagates through the waveguide of the optical resonator, $G=c\alpha_G/n_{eff}$, where $\alpha_G$ is the power gain coefficient of the waveguide, in units of $m^{-1}$. The output power $P_{out}$ is indicative of rotations of the gyroscope 10 by virtue of rotation-induced shifts in the first resonant frequency $\omega_1$ of the first optical resonator 50 and rotation-induced shifts in the second resonant frequency $\omega_2$ of the second optical resonator 60, thereby altering the amount of energy in each of the first and second optical resonators 50, 60.

Figure 1B:
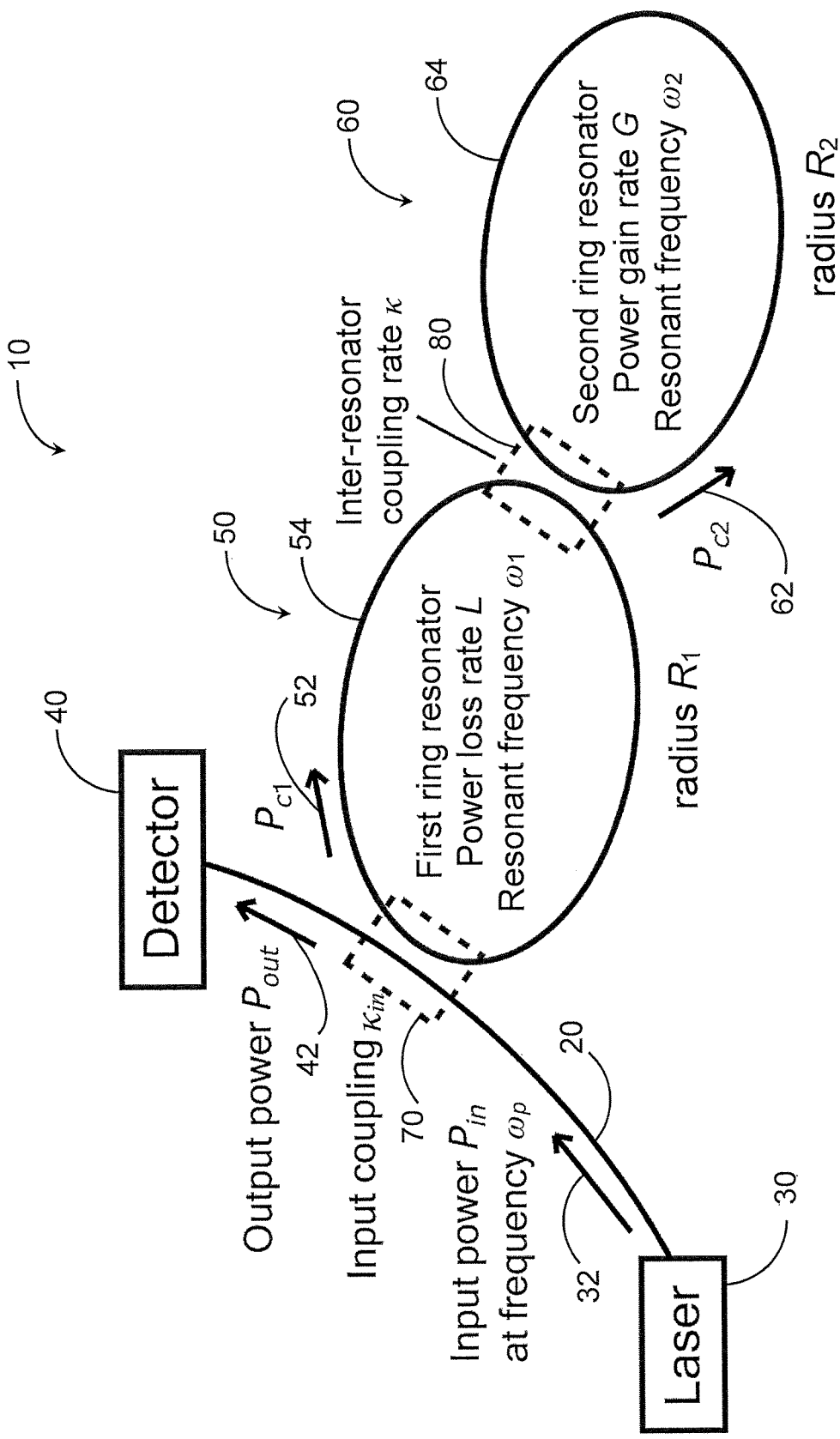
FIG. 1B schematically illustrates an example gain-coupled ring resonator gyroscope having an unfolded configuration in which the first optical resonator comprises a loss ring resonator and the second optical resonator comprises a gain ring resonator in accordance with certain embodiments described herein.
Figure 1C:
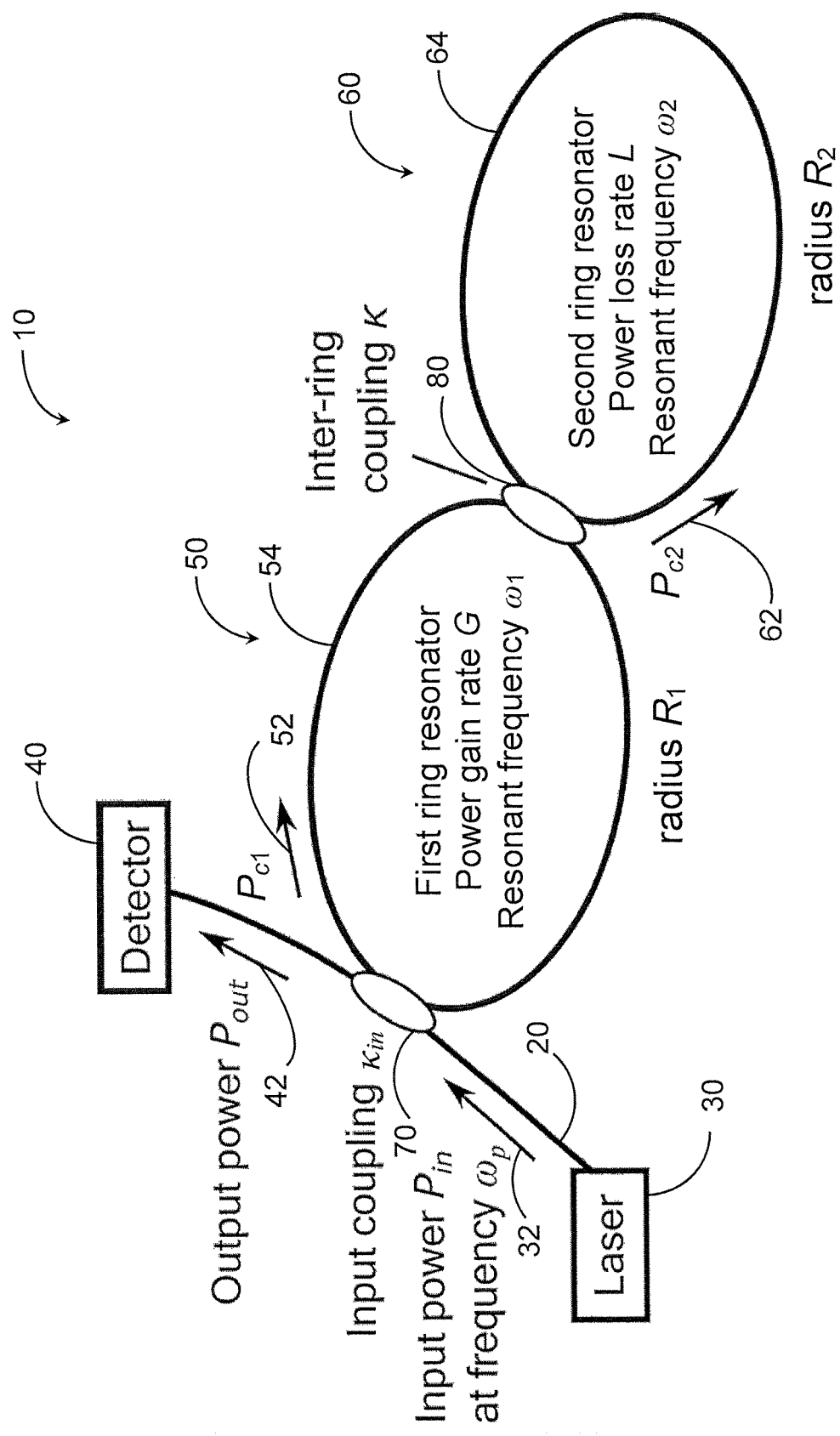
FIG. 1C schematically illustrates an example gain-coupled resonator gyroscope having an unfolded configuration in which the first optical resonator comprises a gain ring resonator and the second optical resonator comprises a loss ring resonator in accordance with certain embodiments described herein.
Figure 1D:
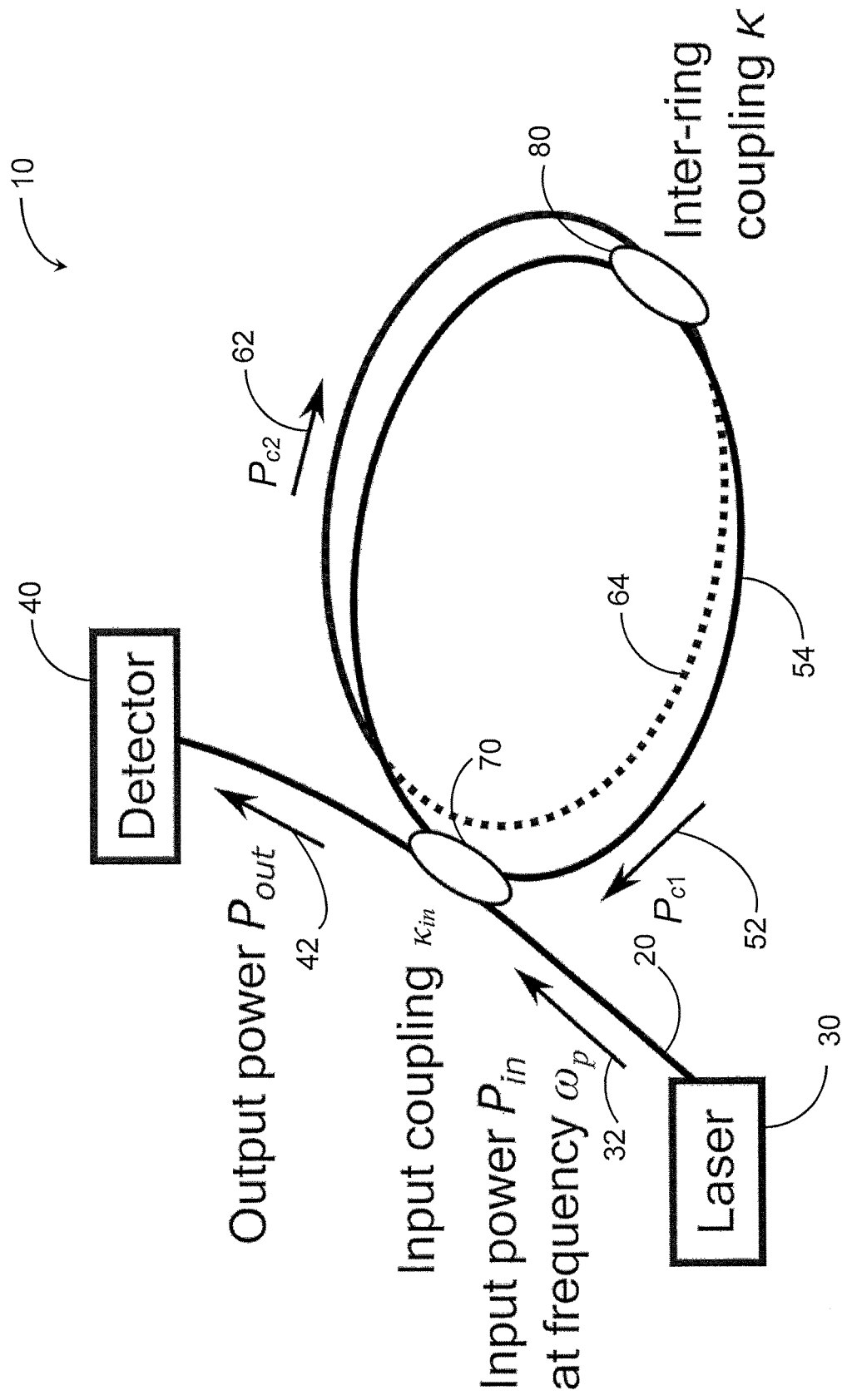
FIG. 1D schematically illustrates an example gain-coupled resonator gyroscope having a folded configuration in which the first optical resonator comprises a gain ring resonator and the second optical resonator comprises a loss ring resonator in accordance with certain embodiments described herein.

FIG. 1B schematically illustrates an example gain-coupled resonator gyroscope 10 having an unfolded configuration in which the first optical resonator 50 comprises a loss ring resonator 54 having a loss rate L and the second optical resonator 60 comprises a gain ring resonator 64 having a gain rate G in accordance with certain embodiments described herein. FIG. 1C schematically illustrates an example gain-coupled resonator gyroscope 10 having an unfolded configuration in which the first optical resonator 50 comprises a gain ring resonator 54 having a gain rate G and the second optical resonator 60 comprises a loss ring resonator 64 having a loss rate L in accordance with certain embodiments described herein. FIG. 1D schematically illustrates an example gain-coupled resonator gyroscope 10 having a folded configuration in which the first optical resonator 50 comprises a gain ring resonator 54 having a gain rate G and the second optical resonator 60 comprises a loss ring resonator 64 having a loss rate L in accordance with certain embodiments described herein. In certain embodiments, the second ring resonator 64 is folded beneath the first ring resonator 54 (e.g., as schematically illustrated in FIG. 1D by the dashed line), while in certain other embodiments, the second ring resonator 64 is folded above the first ring resonator 54. While PT symmetry is no longer present in the folded configuration of FIG. 1D, this configuration still has an exceptional point. The at least one optical detector 40 is configured to measure a change in the output power $P_{out}$ caused by a rotation applied to the gyroscope 10 (e.g., a rotation around an axis substantially perpendicular to a plane of the first and second ring resonators 54, 64).

In certain embodiments, the gyroscope 10 is configured such that the inter-resonator coupling rate κ is not equal to an exceptional point inter-resonator power coupling rate $\kappa_{EP}$. In certain such embodiments in which the first optical resonator 50 is a loss resonator and the second optical resonator 60 is a gain resonator (see, e.g., FIG. 1B), the exceptional point inter-resonator power coupling rate $\kappa_{EP}$ equals $(L+\kappa_{in}+G)/2$. In other such embodiments in which the first optical resonator 50 is a gain resonator and the second optical resonator 60 is a loss resonator (see, e.g., FIGS. 1C and 1D), the exceptional point inter-resonator power coupling rate $\kappa_{EP}$ equals $|L-\kappa_{in}+G|/2$. The sign of $\kappa_{in}$ in these two expressions for $\kappa_{EP}$ is opposite because the presence of the input-output coupler 70 adds a loss mechanism to the first optical resonator 50. Therefore, when light 32 entering the gyroscope 10 encounters the loss ring first, as in FIG. 1B, the input-output coupler 70 increases the resonator loss of the first optical resonator 50. Conversely, when light 32 entering the gyroscope 10 encounters the gain ring first, as in FIGS. 1C and 1D, the input-output coupler 70 decreases the resonator gain of the first optical resonator 50.

In certain embodiments, a ratio $\kappa/\kappa_{EP}$ of the inter-resonator coupling rate κ to the exceptional point inter-resonator coupling rate $\kappa_{EP}$ is in a range of 0.75 to 1.35. In certain embodiments, the ratio $\kappa/\kappa_{EP}$ is less than 0.99 (e.g., in a range of 0.75 to 0.95, in an range of 0.80 to 0.90, in a range of 0.80 to 0.95, or in a range of 0.80 to 0.97), while in certain other embodiments, the ratio $\kappa/\kappa_{EP}$ is greater than 1.01 (e.g., in a range of 1.05 to 1.35, in an range of 1.08 to 1.25, in a range of 1.08 to 1.22, or in a range of 1.09 to 1.22). For example, smaller values of the ratio $\kappa/\kappa_{EP}$ can lead to even larger rotation sensitivities for 0.5 dB of loss per round-trip in the loss resonator. The rotation-induced shift of the coupled first and second optical resonators 50, 60 of certain embodiments are proportional to the square-root of the applied rotation magnitude (e.g., $\sqrt{\Omega}$). This rotation-induced shift is different than the rotation-induced shift of a single-ring resonator which is proportional to the applied rotation magnitude Ω. Therefore, the rate of resonance frequency shift per unit applied rotation magnitude Ω is proportional to the reciprocal of the square-root of the applied rotation magnitude (e.g., $1/\sqrt{\Omega}$) and is infinite in the limit of an infinitesimally small applied rotation magnitude Ω. Ren had previously indicated that such large resonant frequency shifts were only achievable when a gyroscope is operated at the EP and that the rotation sensitivity would be substantially reduced if a gyroscope was operated away from the EP. Contrary to such previous teachings, certain embodiments described herein disclose gyroscopes that achieve higher sensitivities when operated away from the EP than when operated at the EP.

While the two optical resonators 50, 60 of the example gyroscopes 10 of FIGS. 1B-1D comprise two ring resonators 54, 64 and various properties of the gyroscopes 10 are discussed herein with regard to certain embodiments comprising two ring resonators 54, 64, in certain other embodiments, one or both of the ring resonators 54, 64 can be replaced with other types of optical resonators or cavities (e.g., disks, toroids, spheres, etc.). In certain embodiments, the first resonance frequency $\omega_1$ and the second resonance frequency $\omega_2$ are substantially equal to one another ($\omega_1 = \omega_2 = \omega_0$). In certain such embodiments in which the first ring resonator 54 and the second ring resonator 64 are each substantially circular, the radius $R_1$ of the first ring resonator 54 is substantially equal to the radius $R_2$ of the second ring resonator 64. In certain embodiments, the light source 30 comprises a laser configured to generate optical signals 32 with an angular frequency $\omega_p$, wavelength $\lambda$, and the input power $P_{in} = |\alpha_{in}|^2$. In certain embodiments, the resonance frequency of the coupled first and second ring resonators 54, 64, differs from the first resonance frequency $\omega_1$ and from the second resonance frequency $\omega_2$. In certain embodiments, the frequency $\omega_p$ is within ±20% (e.g., within ±10%; within ±5%) of either the first resonance frequency $\omega_1$ and/or the second resonance frequency $\omega_2$.

As shown in the example gyroscopes 10 of FIGS. 1B and 1C, each of which has an unfolded configuration, light 52 (e.g., optical signals) circulates clockwise in the first ring resonator 54 and some of this light (e.g., light 62) is coupled into the second ring resonator 64 and circulates counterclockwise within the second ring resonator 64, and a portion of the light is coupled back into the first ring resonator 54. In these unfolded configurations, light circulates in the first and second ring resonators 54, 64 in opposite directions. As shown in FIGS. 1B and 1C, in certain embodiments having the unfolded configuration, each of the first ring resonator 54 and the second ring resonator 64 is substantially planar, the first and second ring resonators 54, 64 are substantially coplanar or substantially parallel with one another, and the areas bounded by the first and second ring resonators 54, 64 do not substantially overlap one another.

In the example gyroscope 10 of FIG. 1D, which has a folded configuration, light 52 (e.g., an optical signal) circulates clockwise in the first ring resonator 54 and some of this light (e.g., light 62) is coupled into the second ring resonator 64 and circulates clockwise within the second ring resonator 64, and a portion of the light is coupled back into the first ring resonator 54. In this folded configuration, light circulates in the first and second ring resonators 54, 64 in the same direction. As shown in FIG. 1D, in certain embodiments having the folded configuration, each of the first ring resonator 54 and the second ring resonator 64 is substantially planar, the first and second ring resonators 54, 64 are substantially parallel with one another, and the areas bounded by the first and second ring resonators 54, 64 substantially overlap one another. For example, the second ring resonator 64 of the unfolded configuration can be flipped by 180 degrees to form the folded configuration so that light circulates in the same direction in both the first and second ring resonators 54, 64.

The output power $P_{out} = |\alpha_{out}|^2$ is collected by the at least one optical waveguide 20 (e.g., at an output port of an input-output 2×2 coupler 70 having a coupling ratio $K_{in}$) and is transmitted to the detector 40. For the example gyroscope 10 of FIG. 1B, the total loss rate of the first ring resonator 54, including the coupling rate of the input-output coupler 70 and the inter-resonator coupler 80, is then L+$\kappa_{in}$+$\kappa$, and the gain rate of the second ring resonator 54, including the coupling rate of the inter-resonator coupler 80, is G−$\kappa$. For the example gyroscope 10 of FIG. 1C, the net gain rate (e.g., the gain rate) of the first ring resonator 54, including the coupling rate of the input-output coupler 70 and the inter-resonator coupler 80, is then G−$\kappa_{in}$−$\kappa$, and the net loss rate (e.g., the loss rate) of the second ring resonator is L+$\kappa$. The parameters L, G, $\kappa_{in}$, and $\kappa$ are in units of s$^{-1}$ as they correspond to rates of energy loss, energy gain, or energy transfer per unit time.

In certain embodiments, the laser 30 is a fiber laser or a semiconductor laser operating in the 1.5-μm range or in the 1-μm range. In certain embodiments, each of the first ring resonator 54 and the second ring resonator 64 comprises a waveguide (e.g., optical fiber comprising a silica-based material; waveguide fabricated with silicon nitride technology; waveguide comprising another semiconductor material), and the gain ring resonator of the first and second ring resonators 54, 64 can be doped with an ion such as Er$^{3+}$ (e.g., to provide gain around 1.5 μm) or Nd$^{3+}$ (e.g., to provide gain around 1.08 μm).

In certain embodiments, the example gain-coupled resonator gyroscope 10 is operated as a resonator below lasing threshold. Such operation of the example gain-coupled resonator gyroscope 10 of certain embodiments is in contrast to the gyroscope disclosed by Ren which is operated above lasing threshold and generates an optical signal from within the ring resonators. In certain embodiments, the gyroscope 10 uses a readout scheme configured to measure and quantify the sensitivity properly by measuring the rotation-induced change in detected power. In certain embodiments, since an external signal 32 is introduced into the gyroscope 10 to probe the Sagnac phase shift, and since this signal recirculates a large number of times in the gain ring resonator of the first and second ring resonators 54, 64 (e.g., the first ring resonator 54 of FIG. 1C; the second ring resonator 64 of FIG. 1B), the gain in the gain ring resonator can be reduced by the strong recirculating signal (e.g., by gain saturation). Since modeling of the example gyroscope 10 of FIGS. 1A-1D in the presence of gain saturation is rather complex, the system parameters and the input power can be selected such that the power circulating in the gain ring resonator of the first and second ring resonators 54, 64 can be much smaller than the saturation power of the gain medium. In certain such embodiments, the gain then remains essentially independent of the circulating power, which simplifies greatly the mathematical analysis of this example gyroscope 10.

In certain embodiments, the gain rate in the gain ring resonator of the first and second ring resonators 54, 64 is smaller than the loss rate in the loss ring resonator of the first and second ring resonators 54, 64, as described more fully herein. In certain embodiments, the sensitivity is not at a maximum at the exceptional point, but the sensitivity is at a maximum when the gyroscope 10 is detuned from the exceptional point towards stronger inter-ring coupling than the coupling that produces the exceptional point. In certain embodiments, the gyroscope 10 exhibits a sensitivity that is significantly stronger than that of a single-ring gyroscope (RFOG) with the same ring radius and the same round-trip loss as the loss ring resonator of the first and second ring resonators 54, 64. For example, assuming a reasonable saturation power of 2 mW (e.g., as is typical in a fiber amplifier), the rotation sensitivity enhancement over the equivalent single-ring gyroscope with the same ring radius and round-trip loss can be greater than a factor of about 250.

The sensitivity to rotation of this gyroscope 10 can be modeled using the temporal coupled-mode theory (e.g., described in chapter 10 of J. J. D. Joannopoulos et al., *Photonic crystals: molding the flow of light.* 2008) in which the resonating fields are characterized by complex energy amplitudes $\alpha_1$ and $\alpha_2$ such that $|\alpha_1|^2$ is the total energy stored in the first ring resonator 54 and $|\alpha_2|^2$ is the total energy stored in the second ring resonator 64. This formalism is independent of the type of optical resonators 50, 60 or cavities of the gyroscope 10 (e.g., disk, toroid, sphere, ring, etc.).

In general, an optical device is said to be PT symmetric when its complex refractive index profile satisfies n(x,y,z)= n(-x,-y,-z)*, where x, y, and z are the device's principle axes (R. El-Ganainy et al., "Theory of coupled optical PT-symmetric structures," *Opt. Lett.*, vol. 32, no. 17, p. 2632, 2007). In other words, the real part of the refractive index is even (P symmetry) while the imaginary part is odd (T symmetry) (see, Peng). For the gain-coupled resonator gyroscope 10 of FIG. 1A, P symmetry is imposed by giving both the first and second ring resonators 54, 64 the same resonance frequencies ($\omega_1=\omega_2=\omega_0$) and T symmetry is imposed by setting the gain rate in the second ring resonator 64 equal to the loss rate in the first ring resonator 54, including the loss from the input-output coupler 70, such that $G=L+\kappa_{in}$. For the gain-coupled resonator gyroscope 10 of FIG. 1C, T symmetry is imposed by setting the loss rate in the second ring resonator 64 equal to the gain rate in the first ring resonator 54 minus the input coupling rate of the input-output coupler 70 such that $L=G-\kappa_{in}$. As described more fully herein, in certain embodiments, the condition of exact PT-symmetry of the gain-coupled resonator gyroscope 10 can be relaxed for the purpose of enhancing the sensitivity to rotation.

Exceptional Point

For the gain-coupled resonator gyroscope 10 of FIG. 1B in which the probe laser 30 is coupled into the loss resonator first, the coupled-mode equations for the stored energy amplitudes are (see, Ren):

$$dx_L/dt=(-i\omega_1-(L+\kappa_{in})/2)x_L-i\kappa x_G/2-\sqrt{\kappa_{in}}\alpha_{in}$$

$$dx_G/dt=(-i\omega_2+G/2)x_G-i\kappa x_L/2 \quad (1a)$$

where $x_L(t)$ and $x_G(t)$ are the average resonating fields in the loss ring resonator 54 and the gain ring resonator 64, respectively, such that $|x_L(t)|^2$ and $|x_G(t)|^2$ are the total energies stored in the corresponding ring resonators at time t. For the gain-coupled resonator gyroscopes 10 of FIGS. 1C and 1D, in which the probe laser is coupled into the gain resonator first, the coupled-mode equations for the stored energy amplitudes are (see, Ren):

$$dy_G/dt=(-i\omega_1+(G-\kappa_{in})/2)y_G-i\kappa y_L/2-\sqrt{\kappa_{in}}\alpha_{in}$$

$$dy_L/dt=(-i\omega_2-L/2)y_G-i\kappa y_L/2 \quad (1b)$$

where $y_G(t)$ and $y_L(t)$ are the average resonating fields in the gain ring resonator 50 and the loss ring resonator 60, respectively, such that $|y_G(t)|^2$ and $|y_L(t)|^2$ are the total energies stored in the corresponding ring resonators. In certain embodiments, $\alpha_{in}=\exp(-i\omega_p t)\sqrt{P_{in}}$, where $P_{in}$ is the power of the light 32 incident on the gyroscope 10 (e.g., power of the light 32 inputted to the gyroscope 10) and $\omega_p$ is the angular frequency of the light 32.

Rotating a conventional single-ring gyroscope shifts the resonance frequency of the ring from $\omega_0$ to $\omega_0+\varepsilon_s$, where $\varepsilon_s=\omega_p R\Omega/cn_{eff}$ is the Sagnac frequency shift, $\Omega$ is the rotation rate, and R is the radius of the ring (see Section 2.2.2 of H. C. Lefèvre, *The Fiber Optic Gyroscope*, 2nd ed. Artech House, 2014). In certain embodiments, a rotation applied to a gain-coupled resonator gyroscope 10 with unfolded rings (see, e.g., FIGS. 1B and 1C) shifts the frequency of the first ring resonator 54 from $\omega_1=\omega_0$ to $\omega_0+\varepsilon_s$ and shifts the frequency of the second ring resonator 64 from $\omega_2=\omega_0$ to $\omega_0-\varepsilon_s$. The frequency shifts in $\omega_1$ and $\omega_2$ have opposite signs from one another because the light is propagating in opposite directions in the first and second ring resonators 54, 64, so the Sagnac phase shifts have opposite signs. In certain embodiments, a rotation applied to a gain-coupled resonator gyroscope 10 with folded rings (see, e.g., FIG. 1D), the shifts are equal to one another. Specifically, the frequency of the first ring resonator 54 shifts from $\omega_1=\omega_0$ to $\omega_0+\varepsilon_s$, and the frequency of the second ring resonator 64 shifts from $\omega_2=\omega_0$ to $\omega_0+\varepsilon_s$. These two shifts are equal in magnitude. Because the light in the first and second ring resonators 54, 64 circulates in the same direction as one another, these two shifts also have the same sign.

In certain embodiments, the gyroscope 10 can be modeled to account for gain depletion due to the signal power circulating in the gain ring resonator, which can become very large and can exceed the saturation power (e.g., when the gain is of the order of the loss; see, M. J. Grant and M. J. F. Digonnet, "Loss-gain coupled ring resonator gyroscope," *Opt. Opto-Atomic, Entanglement-Enhanced Precis. Metrol.*, vol. 10934, March 2019). Assuming that the gain mechanism is stimulated emission in trivalent erbium doped in a host material such as silica, in the presence of gain depletion, the gain rate is not a constant but depends on the signal power according to: $G=G_0/(1+P_G/P_{sat})$ where $G_0$ is the small-signal gain rate, $P_G$ is the average power circulating in the gain ring resonator, and $P_{sat}$ is the saturation power of the amplifier. When the first optical resonator 50 has loss and the second optical resonator 60 has gain (as in FIG. 1B), $P_G$ is given by the power circulating in the second optical resonator 60 and is equal to $|x_G(t)|^2 c/(n_{eff} 2\pi R_2)$. When the first optical resonator 50 has gain and the second optical resonator 60 has loss (as in FIGS. 1C and 1D), $P_G$ is given by the power circulating in the first optical resonator 50 and is equal to $|y_G(t)|^2 c/(n_{eff} 2\pi R_1)$. The saturation power $P_{sat}$ can be equal to 2 mW, a value typical of an erbium-doped fiber amplifier (EDFA). In certain embodiments in which the circulating power in the gain resonator, $P_G$, remains at all times much less than the gain medium's saturation power, $P_{sat}$, the gain rate G is a constant at all times and Eqs. (1a) and (1b) are both linear dynamical systems with well-defined analytical solutions.

With no rotation applied to the gyroscope 10, and $\omega_1=\omega_2=\omega_0$, the eigenfrequencies (e.g., resonance frequencies of the coupled first and second ring resonators 54, 64) are:

$$\omega_\pm=\omega_0-i(L+\kappa_{in}-G)/4\pm\sqrt{\kappa^2-\kappa_{EP}^2}/4 \quad (2)$$

When the light encounters the loss resonator first, the eigenvectors associated with the eigenfrequencies of Eq. (1a) are:

$$x_\pm = \left[ 1 \quad i\frac{\kappa_{EP}}{\kappa} \pm \sqrt{1-\frac{\kappa_{EP}^2}{\kappa^2}} \right]^T \quad (3a)$$

When the light encounters the gain resonator first, the eigenvectors associated with the eigenfrequencies of Eq. (1b) are:

$$y_{\pm} = \left[ i\frac{\kappa_{EP}}{\kappa} \pm \sqrt{1 - \frac{\kappa_{EP}^2}{\kappa^2}} \quad 1 \right]^T \quad (3b)$$

where $\kappa_{EP}$ is the value of $\kappa$ necessary to operate at the exceptional point. When the first optical resonator 50 has loss (see, e.g., FIG. 1B), $\kappa_{EP}$ is given by:

$$\kappa_{EP} = (L + \kappa_{in} + G)/2 \quad (4a)$$

When the first optical resonator 50 has gain (see, e.g., FIGS. 1C and 1D), $\kappa_{EP}$ is given by:

$$\kappa_{EP} = |L - \kappa_{in} + G|/2 \quad (4b)$$

Eigenfrequencies are a generalization of an optical system's resonance frequencies. The real part of an eigenfrequency is the optical resonance frequency, and the negative of the imaginary part is the resonance's linewidth.

The point $\kappa = $ 78 $_{EP}$ is an exceptional point because, under this condition, the energy amplitude eigenvectors x+ and x− become exactly parallel (as do y+ and y−); there is only a single eigenvector for the system described by the two-dimensional state space of $x_L$ and $x_G$ (or $y_L$ and $y_G$ when the order of the gain resonator and loss resonator is reversed). At this value of $\kappa$, the eigenspace therefore loses dimensionality; its dimension decreases from 2 to 1 and therefore becomes deficient, which defines an exceptional point. Exceptional points have equivalently been defined by such a "coalescence" of eigenvectors for the PT-symmetric coupled rings (C. E. Rüter et al., "Observation of parity-time symmetry in optics," *Nat. Phys.*, vol. 6, no. 3, pp. 192-195, 2010). However, PT symmetry is not required for the existence of this exceptional point (see, Rüter).

The motivation behind using exceptional points for sensing is readily seen upon applying an external perturbation to the gyroscope 10, for example, by rotating the gyroscope 10. For a single-ring cavity, a small rotation rate of $\Omega$ around an axis perpendicular to the plane of the ring shifts the ring's resonance angular frequency by:

$$\varepsilon_s = \frac{\omega_p R}{c n_{eff}} \Omega \quad (5)$$

where R is the radius of the ring, $n_{eff}$ is the effective index of the ring's optical mode, and $\omega_p$ is the angular frequency of the probe laser (see Section 2.2.2 of H. C. Lefèvre, *The Fiber Optic Gyroscope*, 2nd ed. Artech House, 2014).

In certain embodiments in which the gain-coupled resonator gyroscope 10 is operated at the exceptional point (EP), a rotation (e.g., about or around an axis substantially perpendicular to the planes of the first and second ring resonators 54, 64) causes the eigenfrequencies of the coupled first and second ring resonators 54, 64 to split. This frequency splitting can be calculated by solving for the complex eigen frequencies of the system of coupled equations given by Eqs. (1a) and (1b). The eigenfrequencies become (see, Ren):

$$\omega_{\pm} = \omega_0 - i(L + \kappa_{in} - G)/4 \pm \sqrt{i\kappa_{EP}\varepsilon_s + \varepsilon_s^2} \approx \omega_0 - i(L + \kappa_{in} - G)/4 \pm (1+i)\sqrt{\kappa_{EP}\varepsilon_s/2} \quad (6a)$$

The eigenfrequencies of Eq. (1b) at the exceptional point in the example folded gyroscope 10 of FIG. 1D to leading order in $\varepsilon_s$ become (see Ren):

$$\omega_{\pm} = \omega_0 - i(L + \kappa_{in} - G)/4 + \varepsilon_s \quad (6b)$$

The rotation-induced shift in eigenfrequency at the exceptional point in the unfolded configurations of the gyroscope 10 (see, e.g., FIGS. 1A-1C) is therefore the difference between Eqs. (6a) and Eq. (2):

$$\Delta\omega_{\pm} = \sqrt{i\kappa_{EP}\varepsilon_s + \varepsilon_s^2} \approx (1+i)\sqrt{\kappa_{EP}\varepsilon_s/2} \quad (7)$$

The real part of Eq. (7) is the rotation-induced shift in resonance frequency, and the imaginary part is the rotation-induced change in linewidth. As pointed out in Ren, the frequency shift follows a square-root dependence on the rotation rate, which is in sharp contrast to almost all other types of gyroscope, such as the RFOG or the FOG, which exhibit a linear response to rotation for very small Sagnac phase shifts (e.g., much less than $\pi$) (see, M. Terrel et al., "Performance comparison of slow-light coupled-resonator optical gyroscopes," *Laser Photonics Rev.*, vol. 3, no. 5, pp. 452-465, 2009) ("Terrel"). A square-root response is of great interest because for small rotation rates, the response is proportionally much larger. In fact, in the limit of an infinitesimal rotation rate, a square-root response becomes infinitely larger.

However, Eq. (7) demonstrates that applying a rotation affects the resonance linewidth just as much as it shifts the resonance frequency, which is very different from the RFOG where only the resonance frequency shifts. In response to a rotation, the resonances of the unfolded gain-coupled resonator gyroscope 10 (see, e.g., FIGS. 1A-1C) in accordance with certain embodiments described herein therefore shift and either broaden or narrow, which greatly affects how the gyroscope 10 can be used in certain embodiments to provide high rotational sensitivity.

Rotational Sensitivity

In certain embodiments, the gain-coupled resonator gyroscope 10 is operated by measuring the rotation-induced change $\delta P_{out}$ in the output power $P_{out}$, arising from the rotation-induced changes in resonance frequency and in linewidth, as expressed by Eqs. (6a) or (6b). In certain such embodiments, the input laser frequency is selected so as to maximize the sensitivity to rotation, as described more fully herein. The rotation-induced changes in resonance frequency and linewidth then cause the transmission at this interrogation frequency to change maximally, which changes the detected output power maximally. A measurement of this power change at the output of the gyroscope 10 (e.g., by the detector 40 shown in FIGS. 1A-1D) then gives a measure of the rotation rate applied to the gyroscope 10. When this scheme is applied to an RFOG, it produces nominally the same sensitivity to rotation as the modulation-biasing scheme routinely used in RFOGs.

In certain embodiments, the minimum detectable rotation rate is defined to be the smallest rotation rate $\Omega$ that induces a $\delta P_{out}$ equal to the noise power in the gyroscope's detection. The minimum detectable rotation rate can be determined by the maximum possible value that the sensitivity (defined as $dT/d\Omega$ evaluated at the probe laser frequency in the limit of $\Omega$ to zero, where T is the power transmission of the gyroscope 10) can take upon optimization of its various free parameters. A very good metric for the performance of a resonator-based optical gyroscope architecture is to compare this maximum possible rotation sensitivity to that achieved by an RFOG of equal area and loss (see, Terrel).

Based on this definition of sensitivity, the total rotation sensitivity of an optical resonator gyroscope is then (see, Terrel):

$$S = \frac{1}{P_{in}}\left(\frac{dP_{out}}{d\Omega}\right)_{\omega=\omega_p} = \left(\frac{dT}{d\Omega}\right)_{\omega=\omega_p} \quad (8a)$$

where $P_{in}$ is the input power from the at least one light source 30, $P_{out}$ is the output power, $d/d\Omega$ is the derivative with respect to the rotation rate that is applied to the gyroscope 10, and $T=P_{out}/P_{in}$ is the power transmission through the gyroscope 10. $dT/d\Omega$ in Eq. (8a) is evaluated at $\omega=\omega_p$ to give the rotation sensitivity of this readout system (namely, the sensitivity to rotation of the signal $P_{out}$ of the gyroscopes in FIGS. 1A-1D).

For most types of conventional gyroscopes that measure a shift in resonant frequency (such as the RFOG), the sensitivity of Eq. (8a) can be rewritten as:

$$S = \left(\frac{\partial T}{\partial \omega}\right)_{\omega=\omega_p} \frac{d\omega_{res}}{d\Omega} \quad (8b)$$

The first factor on the right hand side of Eq. (8b) is the slope of the resonance at the laser frequency $\omega_p$. The second factor on the right hand side of Eq. (8b) is the amount of shift that the resonance frequency undergoes per unit applied rotation rate (in the limit of a small rotation rate), which is the equivalent of the partial rotation sensitivity $|d\omega_{res}/d\Omega|$ where $\omega_{res}$ is a resonance frequency of the gyroscope. For a laser gyroscope (e.g., such as that disclosed by Ren), this shift of the resonance frequency can be measured using an external high-accuracy wavemeter (e.g., interferometer). The ability of the external wavemeter to measure very small frequency shifts at optical frequencies actually limits the total rotation sensitivity of the gyroscope, so the rotation sensitivity of the gyroscope cannot be defined independently of the sensitivity performance of the external wavemeter of the readout system. In most publications on EP sensors, this issue is not addressed, and the implicit assumption is made that some unspecified, presumably high-accuracy instrument will be used to analyze the output of the sensor and recover the frequency splitting accurately. Furthermore, it is often assumed that the total sensitivity is proportional to the frequency splitting, which is not necessarily the case, as will be shown further on.

For conventional passive resonant gyroscopes, a similar shift in resonance frequency can be measured by launching an optical signal from a laser into the gyroscope. The laser frequency $\omega_p$ can be chosen to be detuned from one of the resonances of the gyroscope so as to coincide with an edge portion of the resonance where the transmission has the steepest slope. To measure a small perturbation, such as a rotation, the resonance frequency of the gyroscope shifts and the laser signal, which probes the steep edge of the resonance, experiences a large change in transmission, resulting in a large change in the output power $P_{out}$ transmitted by the gyroscope and detected by the detector. This readout scheme is convenient, because the gyroscope itself is the wavemeter that reads the frequency shift and it is precise when the resonance is sharp, because the maximum slope of the resonance is then quite steep, and the ability of this readout system to discriminate a small frequency shift is enhanced.

For conventional gyroscopes, maximizing the rotation sensitivity comprises selecting the frequency $\omega_p$ to be equal to the frequency of maximum slope of the resonance. As shown in the following, this general readout scheme is also applicable to the example coupled-ring gyroscopes 10 of FIGS. 1C and 1D.

For the unfolded configuration operated at the EP (see, e.g., FIG. 1C), the frequency shift is proportional to $\sqrt{\Omega}$, and the partial sensitivity $|d\omega_{res}/d\Omega|$ is infinite For the folded configuration (see, e.g., FIG. 1D), the partial sensitivity $|d\omega_{res}/d\Omega|$ is equal to $\omega_p R/cn_{eff}$, which is exactly the same as in the single-ring gyroscope. Even though the folded configuration is operated at an EP, it offers no enhancement in the frequency shift because the rotation fails to push it away from the EP. A rotation does not cause spontaneous breaking of the PT symmetry at the EP of the folded configuration. The folded configuration still offers, however, as described herein, an enhancement in rotation sensitivity to rotation (as defined in Eq. (8a)), which suggests that in the example gyroscopes 10 of FIG. 1C and FIG. 1D, the sensitivity enhancement does not occur solely as a result of the increase in the frequency shift. Comparing the folded and unfolded configurations therefore can provide insight into the mechanisms that enhance the sensitivity of gyroscopes operated at an EP, in addition to informing which architecture is more sensitive.

In certain embodiments in which gain saturation is present, an additional mechanism can induce a change in the example coupled-ring resonator gyroscopes 10 of FIGS. 1A-1D. The rotation-induced changes of the resonance frequencies of each ring resonator can induce a change in the power $P_G$ circulating in the gain ring, which in turn changes the level of saturation of the gain, and changes the gain and therefore the circulating power. Under even moderate gain saturation, the gain can therefore depend on the rotation rate, sometimes very strongly. Gain saturation therefore introduces another mechanism by which the output of the example coupled-ring resonator gyroscope 10 of certain embodiments responds to a rotation, and another component to its rotation sensitivity. In general, this dependence of the two eigenfrequencies on $\Omega$ depends on how much the power circulating in the gain ring changes in response to a rotation, which can be solved numerically.

Unfolded Configuration with First Ring Resonator Having the Loss Rate

In the following section, discussion of various aspects of the unfolded configuration with the first ring resonator 54 having the loss rate (see, e.g., FIG. 1B) is provided.

Transmission Spectrum of Gain-Coupled Resonator Gyroscope

The power transmission can be defined as:

$$T := \lim_{t\to\infty} |a_{out}(t)/a_{in}(t)|^2 \quad (9)$$

if this limit exists, where $\alpha_{in}=\exp(-i\omega_p t)\sqrt{P_{in}}$ when the input is a laser of optical frequency $\omega_p$ and constant power $P_{in}$.

Eq. (9) can be evaluated for the example gyroscope 10 of FIG. 1B by first solving for the energy amplitudes $x_L(t)$ and $x_G(t)$ in Eq. (1a) (when G can be assumed constant) in the time-domain by using the method of Laplace transforms, then using the output relation $\alpha_{out}=\alpha_{in}+x_L\sqrt{\kappa_{in}}$ (see Joannopoulos) to solve for $|\alpha_{out}(t)/\alpha_{in}(t)|^2$. The limit of t going to infinity, as in Eq. (9), can then be taken to obtain the transmission spectrum at steady state (if the limit exists).

The exact same procedure can be used to evaluate Eq. (9) for the example gyroscopes 10 of FIGS. 1C and 1D except that $y_L(t)$ and $y_G(t)$ in Eq. (1b) are instead be solved for the output relation $\alpha_{out} = \alpha_{in} + y_G \sqrt{\kappa_{in}}$.

Solving Eqs. (1a) and (1b) for constant G with Laplace transforms demonstrates that when the input power is constant, $x_L(t)$, $x_G(t)$, $y_L(t)$, $y_G(t)$, and $|\alpha_{out}(t)/\alpha_{in}(t)|^2$ all diverge to infinity whenever one of the eigenfrequencies of Eq. (2) has a positive imaginary part. This divergent case corresponds to a transient lasing mode (S. Assawaworrarit et al., "Robust wireless power transfer using a nonlinear parity-time-symmetric circuit," *Nature*, vol. 546, no. 7658, pp. 387-390, 2017) and is an artifact of taking G to be constant, which is equivalent to taking the gain to be unsaturable (e.g., having infinite saturation power). In a real system, the gain will eventually saturate following the onset of lasing (e.g., after a large build-up of circulating power in the gain ring) and very different dynamics than predicted by Eqs. (1a) and (1b) with a constant G will be present (e.g., the output power is then finite for a given input, as dictated by energy conservation). While other modeling methodologies may be useful in analyzing the gyroscope 10 under such saturation conditions, if $P_G$ remains much lower than the gain saturation power $P_{sat}$, Eqs. (1a) and (1b) can be solved accurately by taking G to be constant and using Laplace transforms. Operation of the gyroscope 10 of certain embodiments is confined to be in the region of parameter space where $P_G$ is much smaller than the $P_{sat}$ of a typical optical amplifier (e.g., a few mW, the exact value having no bearing on the qualitative behavior of the gyroscope). To ensure that $P_G \ll P_{sat}$, lasing is prevented when both eigenfrequencies given by Eq. (2) have a negative imaginary part. When the loss resonator of the example gain-coupled ring resonator gyroscope 10 comes first (see, e.g., FIG. 1B), the condition not to lase simplifies to:

$$\kappa^2 > \kappa_{t,LG}^2 = G(L+\kappa_{in}) \text{ and } G < L+\kappa_{in} \tag{10a}$$

When the gain resonator comes first (see, e.g., FIGS. 1C and 1D), the condition not to lase simplifies to:

$$\kappa^2 > \kappa_{t,GL}^2 = L(G-\kappa_{in}) \text{ and } G < L+\kappa_{in} \tag{10b}$$

In accordance with Eqs. (10a) and (10b), for certain embodiments, the gain rate is smaller than the total loss rate (including the loss from the input-output coupler 80 tapping light out of the optical resonator) and, the inter-resonator coupling is greater than the geometric mean of the gain rate and loss rate (including the portion of light purposely tapped out of the optical resonator by the input-output coupler 80). For any arbitrarily small gain G, there exists a range of values of the inter-resonator coupling κ for which the system lases. If either Eq. (10a) or Eq. (10b) is satisfied at steady state, the power transmission of the gain-coupled resonator gyroscope 10 of certain embodiments can be derived via one of two methods. The first method is described in the "supplementary materials" section of Peng, and the second method comprises solving the linear coupled ordinary differential equations with Laplace transforms, which is standardized and systematic. When the loss resonator comes first (see, e.g., FIG. 1B), the transmission is:

$$T = 1 - \kappa_{in} \frac{LG^2/4 - \kappa^2 G/4 + 2\Delta_2^2}{(\kappa^2/4 - \kappa_{t,LG}^2/4 - \Delta_1\Delta_2)^2 + [-G\Delta_1/2 + (L+\kappa_{in})\Delta_2/2]^2} \tag{11a}$$

When the gain resonator comes first (see, e.g., FIGS. 1C and 1D), the transmission is:

$$T = 1 - \kappa_{in} \frac{L\kappa^2/4 - L^2G/4 + G\Delta_2^2}{(\kappa^2/4 - \kappa_{t,GL}^2/4 - \Delta_1\Delta_2)^2 + [L\Delta_1/2 + (G-\kappa_{in})\Delta_2/2]^2} \tag{11b}$$

where $\Delta_1 = \omega - \omega_1 - \varepsilon_s$ and $\Delta_2 = \omega - \omega_2 \pm \varepsilon_s$, for which the plus sign applies when the ring resonators 54, 64 are unfolded (e.g., FIGS. 1B and 1C) and the minus sign applies when the ring resonators 54, 64 are folded (e.g., FIG. 1D). When $\omega_1 = \omega_2 = \omega_0$, $\Delta = \omega - \omega_0$ is the frequency detuning (e.g., the laser frequency is not be chosen to be at $\omega_0$ in order to maximize the rotation sensitivity, as discussed herein).

When Eq. (10a) is not satisfied, the gyroscope 10 of certain embodiments will not behave according to Eq. (11a) even though a plot of Eq. (11a) would appear to give a legitimate spectrum. Similarly, when Eq. (10b) is not satisfied, the gyroscope 10 of certain embodiments does not behave according to Eq. (11b). Additionally, if $P_G \ll P_{sat}$ for all $\omega$, then G is constant and Eqs. (11a) and (11b) can be plotted versus $\omega$ easily. It can therefore be helpful to have expressions for $P_G$ to check whether saturation is indeed negligible. For example, as the equality condition in Eq. (10a) or Eq. (10b) (e.g., a lasing threshold) is approached, the effective net loss of the gyroscope 10 approaches zero, and the circulating power $P_G$ increases. For $P_G$ to remain much smaller than $P_{sat}$, it can be helpful to keep track of how $P_G$ evolves as a function of the system parameters (e.g., L, G, $\kappa_{in}$, and $\kappa$).

If the constant G approximation can be made, the steady-state solution of Eq. (1a) with input $\alpha_{in} = \exp(-i\omega_p t)\sqrt{P_{in}}$ is:

$$x_L(t) = \frac{\sqrt{\kappa_{in}}(i\Delta_2 + G/2)}{\kappa^2/4 + (i\Delta_1 - L/2 - \kappa_{in}/2)(i\Delta_2 + G/2)} e^{-i\omega_p t} \sqrt{P_{in}} \tag{12}$$

and $$x_G(t) = \frac{i\sqrt{\kappa_{in}}\kappa/2}{\kappa^2/4 + (i\Delta_1 - L/2 - \kappa_{in}/2)(i\Delta_2 + G/2)} e^{-i\omega_p t} \sqrt{P_{in}}. \tag{13}$$

The stored energies in each ring resonator 54, 64 are then $$|x_L|^2 = \frac{2\kappa_{in}(G^2/4 + \Delta_2^2)P_{in}}{(\kappa^2/4 - \kappa_{t,LG}^2/4 - \Delta_1\Delta_2)^2 + [-G\Delta_1/2 + (L+\kappa_{in})\Delta_2/2]^2} \tag{14}$$

and $$|x_G|^2 = \frac{\kappa^2 \kappa_{in} P_{in}/4}{(\kappa^2/4 - \kappa_{t,LG}^2/4 - \Delta_1\Delta_2)^2 + [-G\Delta_1/2 + (L+\kappa_{in})\Delta_2/2]^2}. \tag{15}$$

If the coupled resonators are taken to be ring resonators with effectively one-dimensional circulating waves as modes, and both the round-trip loss and gain are small, the circulating power in each ring resonator 54, 64 can be expressed as:

$$P_G = |x_G|^2 \frac{c}{n_{eff} 2\pi R} \text{ and } P_L = |x_L|^2 \frac{c}{n_{eff} 2\pi R}. \tag{16}$$

Figure 2A:
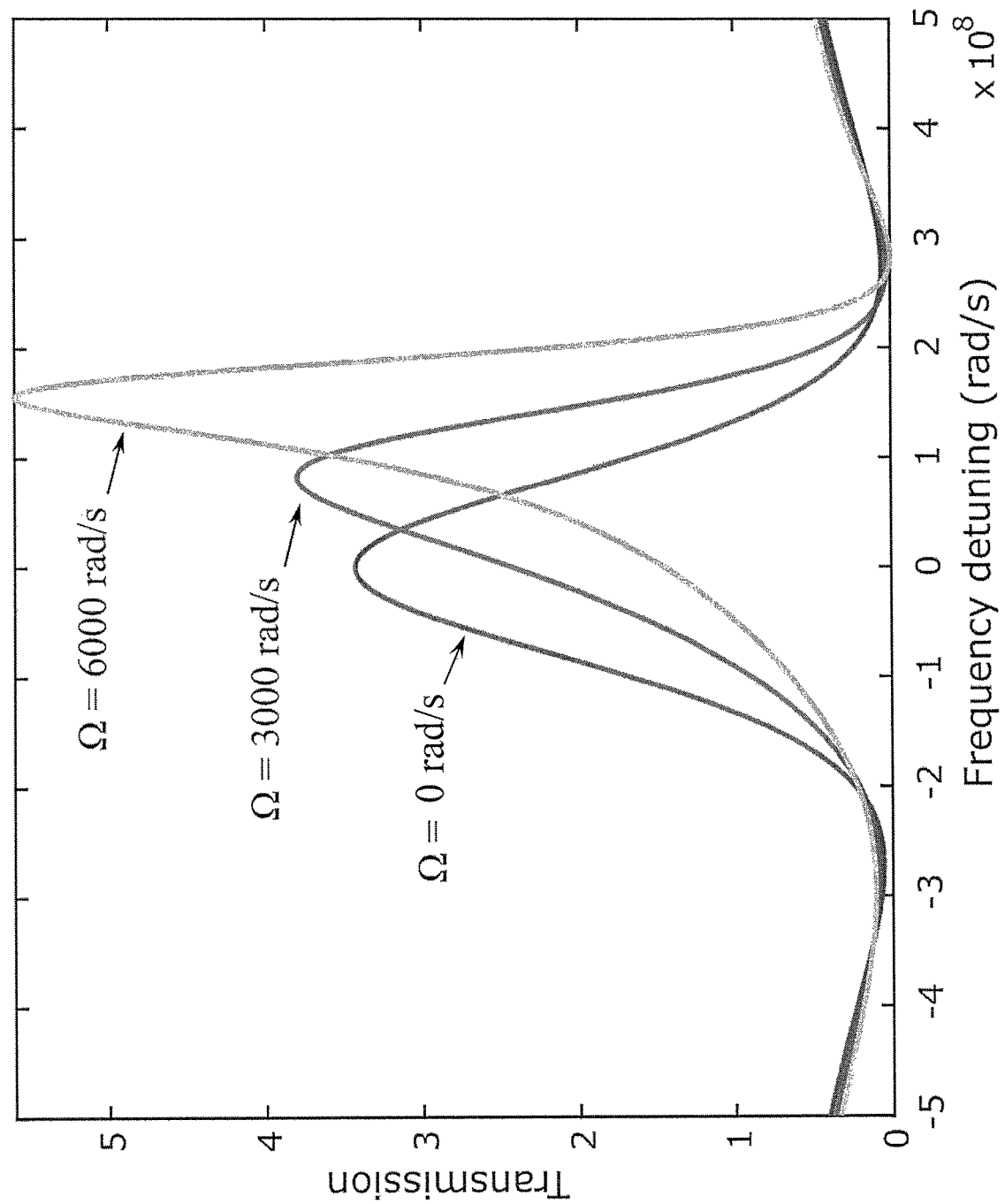
FIG. 2A plots the transmission spectra at the exceptional point for various rotation rates in accordance with certain embodiments described herein.
Figure 2B:
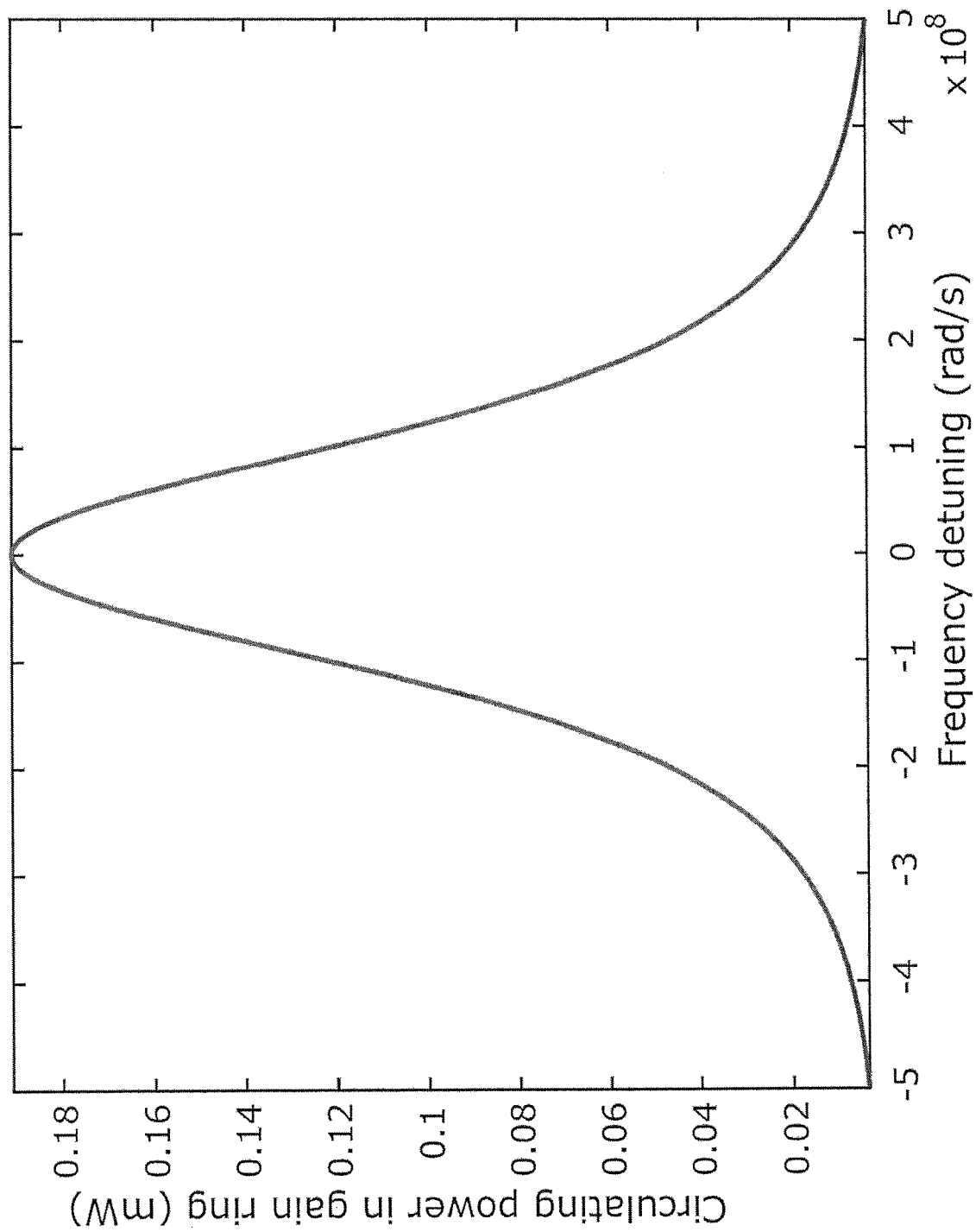
FIG. 2B plots the circulating power in the gain ring in accordance with certain embodiments described herein.

FIG. 2A plots the transmission spectra of a coupled resonator that is at its EP at rest, and when the same coupled resonator is rotated at various rotation rates in accordance with certain embodiments described herein. FIG. 2B plots the circulating power in the gain ring in accordance with certain embodiments described herein when the gyroscope 10 is not rotated. The parameter values for the ring resonators for FIGS. 2A and 2B are R=5 mm, $P_{sat}$=2 mW, L=0.5 dB, $\kappa_{in}$=0.2 dB, G=0.15 dB, an input power $P_{in}$=1 µW, and $\kappa=\kappa_{EP}$ [see Eqs. (4a) and (4b)]. For all frequencies in the transmission spectrum of FIG. 2A, the condition $P_G \leq P_{sat}/10$ holds, the constant G approximation is justified, and the gain depletion due to saturation is small and can be neglected. In FIG. 2A, a single resonance is seen at the exceptional point when the rotation is zero, in accordance with Eq. (2). In accordance with Eq. (6a), applying a rotation (e.g., 3000 rad/s; 6000 rad/s) causes the single resonance at the exceptional point to split into two; one of the resonances broadens while the other narrows, resulting in the change of both the shape and the linewidth of the resonance as seen in FIG. 2A.

The rotation-induced distortion of the resonance shape influences how the sensitivity of the gyroscope 10 is to be characterized. For the RFOG, rotation causes the transmission spectrum to shift without any distortion at all, such that the transmission spectrum of a rotating single-ring resonator is indistinguishable from that of a non-rotating single-ring resonator with an appropriately different optical path length (M. S. Shahriar et al., "Ultrahigh enhancement in absolute and relative rotation sensing using fast ans slow light," Phys. Rev. A 75, 053807 (2007)). For a fixed wavelength range of operation, the sensitivity of an RFOG can be enhanced only by increasing the area of the sensing coil or by reducing its loss, which increases the slope of the transmission spectrum. The slope of the transmission spectrum is proportional to the effective index of the ring's optical mode $n_{eff}$, while the second term is proportional to $1/n_{eff}$, therefore the RFOG sensitivity is independent of the mode effective index.

The rotation-induced resonance shift for the gain-coupled resonator of certain embodiments, given by Eq. (7), can be several orders of magnitude larger than that of an RFOG of the same size (see, Ren) because the response to a small rotation rate (e.g., a small frequency shift $\varepsilon_s$) near the exceptional point is proportional to $\sqrt{\Omega}$ which is much larger than $\Omega$ for small rotation rates. If the Sagnac phase shift in an RFOG could be enhanced, the rotation sensitivity would be enhanced proportionally because in the RFOG's single ring resonator, the Sagnac effect manifests itself as a translation of the transmission spectrum without distortion. In the gain-coupled resonator gyroscope 10 of certain embodiments described herein, the Sagnac effect is accompanied by a distortion of the spectrum (see FIG. 2A), so a rotation-induced change in detected power results from both the rotation-induced resonance frequency shift and the spectral distortion.

Expression for Rotation Sensitivity for Gain-Coupled Resonator Gyroscope

In certain embodiments, the rotation sensitivity of the gain-coupled resonator gyroscope 10 for $P_G \ll P_{sat}$ can be expressed as:

$$\frac{dT}{d\Omega}\bigg|_{\Omega=0} = \frac{\partial T}{\partial \varepsilon_s} \cdot \frac{d\varepsilon_s}{d\Omega} \text{ where} \quad (17)$$

$$\frac{\partial T}{\partial \varepsilon_s}\bigg|_{\Omega=0} = \frac{4\kappa_{in}\Delta(G^2L/8 + \Delta^2 L/2 - G\kappa^2/8)(\kappa^2/4 - G^2/4 - \Delta^2)}{[(\kappa^2/4 - \kappa_{t,LG}^2/4 - \Delta^2)^2 + (L+\kappa_{in} - G)^2\Delta^2/4]^2} - \frac{\kappa_{in}\kappa^2\Delta(\kappa_{in}^2/4 + \Delta^2 - \kappa^2/4 - L^2/4)}{[(\kappa^2/4 - \kappa_{t,LG}^2/4 - \Delta^2)^2 + (L+\kappa_{in} - G)^2\Delta^2/4]^2}. \quad (18)$$

Figure 3:
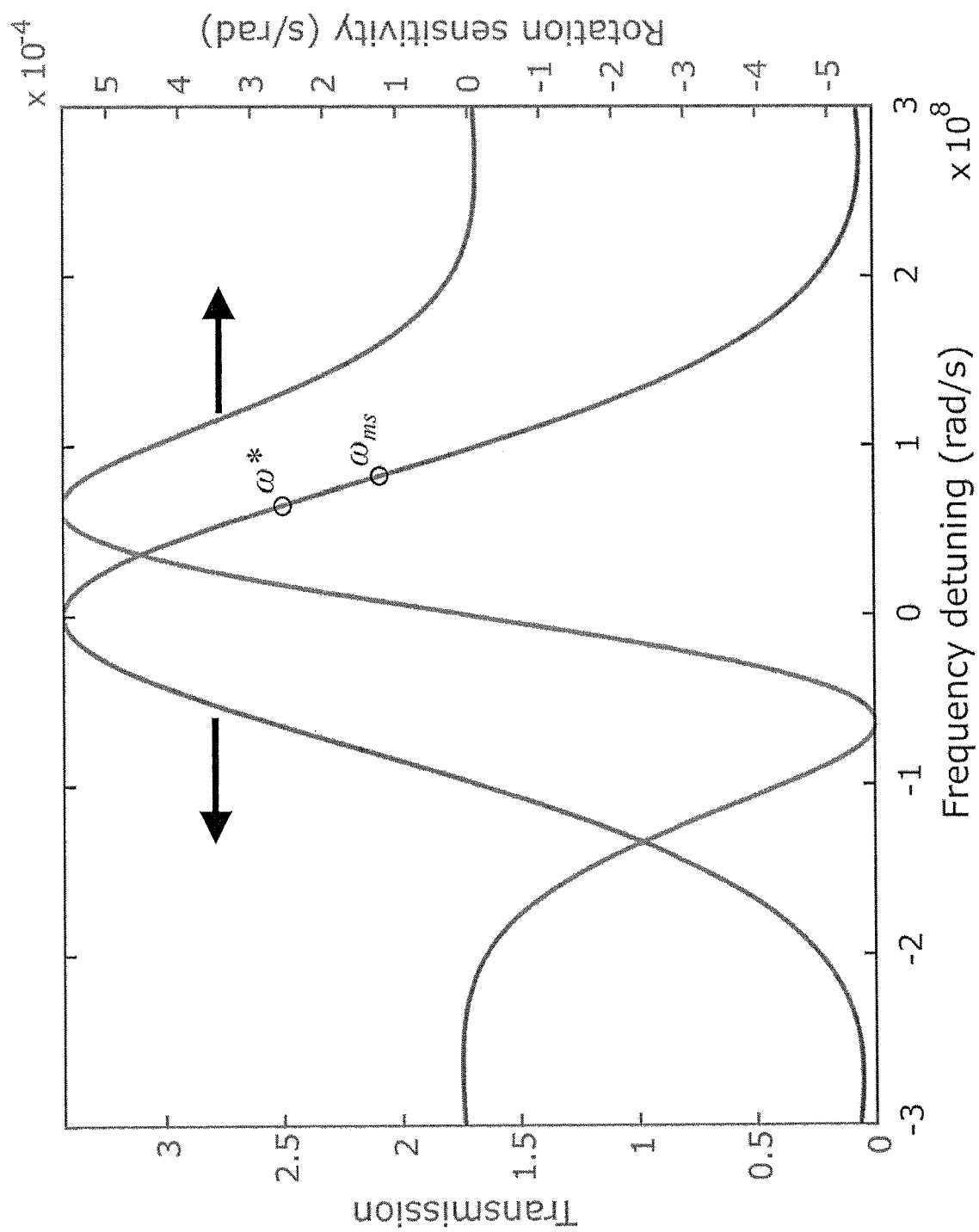
FIG. 3 plots the rotation sensitivity at an exceptional point in accordance with certain embodiments described herein, alongside the transmission spectrum for the same parameter values as used for FIG. 2A.

FIG. 3 plots the rotation sensitivity (using Eqs. (17) and (18)) at an exceptional point in accordance with certain embodiments described herein, alongside the transmission spectrum for the same parameter values as used for FIG. 2A. The condition $P_G \ll P_{sat}$ is met at all frequencies in the spectrum. For an RFOG, maximum rotation sensitivity would be achieved when the input laser wavelength coincides with the point of maximum transmission slope (dT/dω), as indicated by $\omega_{ms}$ in FIG. 3 (as an illustration, since this transmission spectrum was not plotted for an RFOG). The reason is that under rotation, the transmission spectrum for the RFOG shifts in frequency without distortion, and the change in the power transmitted by the RFOG is therefore maximum when the transmission spectrum is probed at its maximum slope. For the gain-coupled resonator gyroscope 10 of certain embodiments, the transmission spectrum shifts and is distorted (see FIG. 2A), and as a result, the maximum rotation sensitivity is no longer obtained at the wavelength where the slope is largest. Instead, it is maximized at a frequency that does not necessarily coincide with the maximum slope, as indicated by ω* in FIG. 3. The interrogation frequency ω* to be used in certain embodiments can be found analytically by optimizing Eq. (18), but a numerical approach can be used instead for simplicity, as described more fully herein. The difference in sensitivity when the gyroscope 10 is probed at the optimum frequency (ω*) compared to when it is probed at the frequency where the slope is maximum ($\omega_{ms}$) can be relatively small, at least in some particular examples. For example, the sensitivity can be larger at ω* than it is at $\omega_{ms}$ (e.g., by at least 2%; by at least 5%; by at least 7%).

Numerical Optimization Routine

In certain embodiments, the rotation sensitivity of the gain-coupled resonator gyroscope 10 is maximized, and the rotational sensitivity of the maximized gain-coupled resonator gyroscope 10 can be compared to that of an RFOG (e.g., an RFOG having the same ring radius and loss) which is also optimized independently for rotation sensitivity. For example, the RFOG ring radius can be 5 mm and its round-trip loss can be 0.5 dB, and the loss ring of the gain-coupled resonator gyroscope 10 can also have a radius of 5 mm and a round-trip loss of 0.5 dB, and the gain ring can also have a radius of 5 mm. The input coupling rate $\kappa_{in}$ and the input laser frequency $\omega_p$ can both be optimized to maximize the rotation sensitivity (e.g., to achieve the highest possible rotation sensitivity). The maximum rotation sensitivity attainable with an RFOG, for any given input coupling and loss, is achieved by selecting the input laser frequency $\omega_p$ to coincide with the steepest portion of the transmission spectrum of the RFOG (e.g., at frequency $\omega_{ms}$, as shown in FIG. 3). The input coupling rate $\kappa_{in}$ is then chosen to maximize the transmission slope at $\omega_{ms}$.

In certain embodiments in which the light encounters the loss ring first (see, e.g., FIG. 1B), a similar approach can be used to optimize the gain-coupled resonator gyroscope 10 for rotation sensitivity. For example, the radii of the first and second ring resonators 54, 64 can be equal to that of the RFOG (e.g., $R_1=R_2=5$ mm) and the round-trip loss of the first ring resonator 54 can be equal to the round-trip loss of the RFOG (e.g., 0.5 dB or L=7.21×10⁸ s⁻¹), excluding the portion of the power that is tapped out of the first ring resonator 54 by the two couplers 70, 80. For the purposes of simulation, the input power $P_{in}$ can be taken as equal to 1 µW. The remaining free parameters are the input coupling $\kappa_{in}$, the input laser frequency $\omega_p$, the gain rate G in the second ring resonator 64, and the inter-resonator coupling rate κ. However, if operation at the exceptional point is imposed, κ is fixed by the choices of $\kappa_{in}$ and G to $\kappa_{EP}=(L+\kappa_{in}+G)/2$ (see Eq. (4a)). Additionally, as explained in relation to FIG. 3, the optimal value of $\omega_p$ no longer coincides with the steepest part of the transmission spectrum, so in order to maximize the sensitivity, a more extensive search over $\omega_p$ can be performed.

In certain embodiments, subtle complications can arise in the optimization of G because it is not an entirely free parameter. Some values of $\kappa_{in}$, $\omega_p$, G, and κ result in very large values for $P_G$ (see Eq. (16)). For example, if the chosen parameter values are such that $P_G$ is on the order of $P_{sat}$, the linearized model of Eq. (1a) with constant G no longer applies with sufficient precision, and the rotation sensitivity cannot be calculated with Eqs. (17) and (18). In certain embodiments, for $P_G \approx P_{sat}$, the gain rate in an example gain-coupled resonator gyroscope 10 saturates and is therefore reduced to a value lower than $G_0$, and this gain rate would no longer be a constant. Certain embodiments include the situation of a gain depleted by saturation. This condition can limit the unsaturated gain rate $G_0$, which is still a free parameter but cannot exceed a certain value, above which the circulating power approaches or exceeds the saturation power.

For example, in the discussion herein, the input power is fixed to be equal to 1 μW, the saturation power $P_{sat}$ is equal to 2 mW, and only small enough values of the unsaturated gain rate G are considered so that upon optimization of the remaining free parameters ($\kappa_{in}$, κ, and $\omega_p$), the circulating power $P_G$ is less than or equal to 0.2 mW (e.g., $P_G \leq P_{sat}/10$). Because Eq. (16) computes $P_G$ for a gain medium with infinite saturation power, for $P_G \leq P_{sat}/10$, the gain rate will never reach a point of appreciable saturation (e.g., the constant G approximation is justified). In certain embodiments, a $P_G$ close to or greater than $P_{sat}$ can be reached in a transient before steady-state is reached, in which case the gain could appreciably saturate for a brief period of time and affect the dynamics of the gain-coupled resonator gyroscope 10, but this possibility can be ignored on the basis that a smaller input power can always be used to produce a low enough circulating power. To summarize, in simulations for every value of the relevant parameters, the circulating power can be calculated using Eq. (16). If the condition $P_G \leq P_{sat}/10$ is satisfied, the sensitivity is calculated, and if the condition it is not satisfied, the assumption of negligible gain depletion is violated, and the sensitivity obtained for this set of parameters is not retained as a valid prediction.

In certain embodiments, a sensitivity enhancement factor can be defined and used as a figure of merit for the gain-coupled resonator gyroscope 10 with a given set of parameters. The sensitivity enhancement factor can be computed by evaluating the rotation sensitivity of the gain-coupled resonator gyroscope 10 with the given set of parameter values and normalizing this sensitivity to the maximum possible rotation sensitivity of an RFOG of equal ring radius and loss, as described herein.

Maximum Rotation Sensitivity at the Exceptional Point as a Function of Gain

Figure 4:
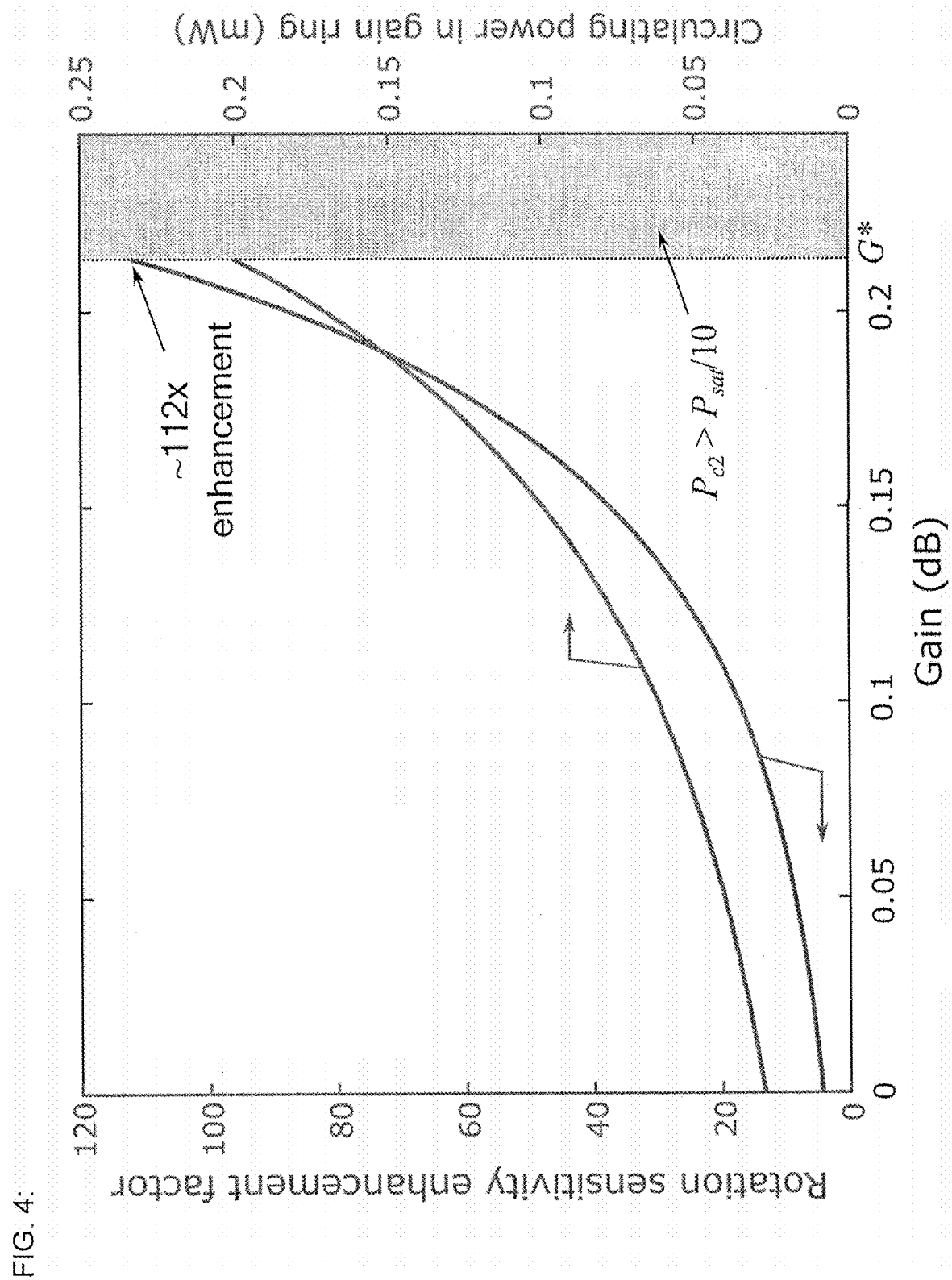
FIG. 4 plots the rotation sensitivity enhancement factor and the power $P_G$ circulating in the second ring resonator at the exceptional point as a function of the gain G in the second ring resonator in accordance with certain embodiments described herein.

FIG. 4 plots the rotation sensitivity enhancement factor and the power $P_G$ circulating in the second ring resonator 64 at the exceptional point as a function of the gain rate G in the second ring resonator 64 for the configuration of FIG. 1B in accordance with certain embodiments described herein. For each value of the gain rate G in FIG. 4, the input coupling $\kappa_{in}$ and the input laser frequency $\omega_p$ were swept across a fine mesh, the rotation sensitivity was evaluated at each point via Eqs. (18) and (19), and the largest sensitivity found was plotted in FIG. 4. $P_{in}$ was held constant at 1 μW across FIG. 4. For the calculations of FIG. 4, the gain-coupled resonator gyroscope 10 was imposed to be operated at the exceptional point for all values of the gain rate G by retuning the inter-ring coupling κ to $\kappa_{EP}=(L+\kappa_{in}+G)/4$ at every point. The inter-ring coupling κ is different for each gain rate G in FIG. 4 because $\kappa_{EP}$ depends on G, because different G values demand different $\kappa_{in}$ values to maximize the rotation sensitivity, and $\kappa_{EP}$ depends on $\kappa_{in}$.

FIG. 4 shows that the rotation enhancement factor optimized in this fashion increases monotonically as the gain rate G is increased. The lowest value of the rotation enhancement factor of FIG. 4 is 4.3 at G=0. The highest value of the rotation enhancement factor of FIG. 4 is about 112, which means that when the gain-coupled resonator gyroscope 10 is operated under these conditions, the rotation sensitivity is about 112 times larger than that of an RFOG with the same round-trip loss of 0.5 dB and the same ring radius of 5 mm. FIG. 4 also shows that the power $P_G$ circulating in the second ring resonator 64 (e.g., the gain ring) also increases monotonically with the gain rate G. For the simulations of FIG. 4, there is a value of the gain rate at 0.2136 dB, labeled G*, where $P_G$ becomes equal to $P_{sat}/10$ (upon optimization of $\kappa_{in}$ and $\omega_p$). The gray-shaded region above this value in FIG. 4 represents the values of the gain rate G where the circulating power in the second ring resonator 64 (the gain ring) is equal or larger than $P_{sat}/10$.

FIG. 4 demonstrates that a very large enhancement in rotation sensitivity (as compared to the rotation sensitivity of an RFOG) can be achieved with the gain-coupled resonator gyroscope 10 when operating at the exceptional point. With a gain rate G of 0.2136 dB, the rotation sensitivity enhancement factor is about 112 at the exceptional point. Even with zero gain (G=0) and still at an exceptional point, the rotation sensitivity enhancement factor is only about 4.3. As pointed out in Ren, larger values of the gain rate G increase the rotation-induced shift (see Eq. (7)) and could therefore increase the rotation sensitivity proportionally to increases of the shift. However, increasing the gain rate G from 0 dB to 0.2136 dB only increases the rotation-induced shift by about 7% while the rotation sensitivity increases by a factor of about 20. This observation indicates that when operating as a gain-coupled resonator gyroscope 10 in certain embodiments described herein (as opposed to being operated as a laser as disclosed by Ren), the majority, if not all, of the rotation sensitivity enhancement is due to a mechanism other than the enhancement of the rotation-induced resonance frequency shift achieved by having a larger $\kappa_{EP}$.

FIG. 4 shows that there is a strong correlation between the increase in the circulating power $P_G$ with increasing gain rate G and the increase in the rotation sensitivity enhancement factor. A larger gain rate G allows the circulating power $P_G$ to become larger, which means more recirculations of the light in the second ring resonator 64 (e.g., the gain ring), and therefore a larger total accumulated Sagnac phase. For example, as shown in FIG. 4, for a gain rate G of 0.2 dB, the circulating power $P_G$ is about 6.2 times larger than it is with G=0, which is on the order of the difference in rotation sensitivity between the two points (e.g., about 20 times). Dividing the rotation sensitivity enhancement factor curve of FIG. 4 by the circulating power curve of FIG. 4 confirms that these two quantities are not proportional to each other. The enhancement of the circulating power $P_G$ (and therefore the larger number of recirculations) therefore does not fully explain the rotation sensitivity enhancement, although it does provide a better intuition for the large rotation sensitivity increase beyond the increase in the rotation-induced frequency shift alone. It also suggests that maximizing the rotation-induced frequency shift does not, in general, maximize the rotation sensitivity.

In certain embodiments, larger values of the gain rate G than those plotted in FIG. 4 produce even larger rotation sensitivity enhancement factors. Such rotation sensitivity enhancement factors can be determined using a model of the gain-coupled resonator gyroscope 10 in the presence of gain saturation to calculate the optimum trajectory of the rotation sensitivity enhancement factor in the gray area of FIG. 4 as the gain rate G approaches the maximum possible value before the structure lases (e.g., 0.5 dB) and to predict how much higher than 112 the rotation sensitivity enhancement factor can be. However, it is possible to explore this gray region even while imposing the condition that $P_G=P_{sat}/10$. To generate the rotation sensitivity enhancement factor curve of FIG. 4, the parameters $\kappa_{in}$ and $\omega_p$ were adjusted to maximize the rotation sensitivity while making sure that the circulating power $P_G$ remained equal to $P_{sat}/10$. $P_{in}$ was held constant at 1 μW across FIG. 4. It is possible to apply the same optimization process in the gray region of FIG. 4, namely, to choose these two parameters such that the rotation sensitivity enhancement factor is maximized, while also imposing that the circulating power $P_G$ is equal to $P_{sat}/10$.

Figure 5:
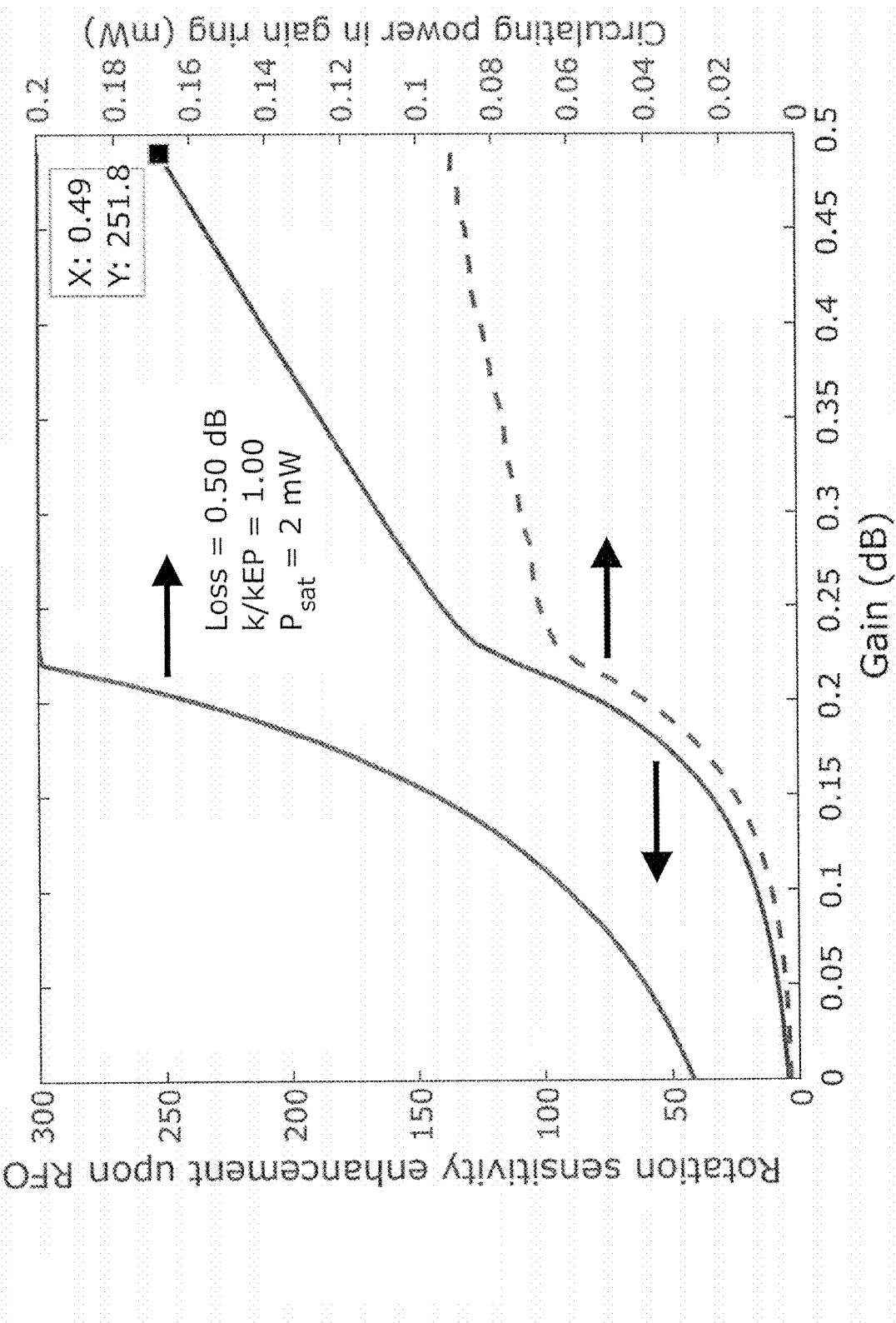
FIG. 5 plots the optimized rotation sensitivity enhancement factor and the power $P_G$ circulating in the second ring resonator as a function of the gain Gin the second ring resonator, below and above G*, in accordance with certain embodiments described herein.

FIG. 5 plots the optimized rotation sensitivity enhancement factor (solid middle curve) and the power $P_G$ circulating in the second ring resonator 64 (solid upper curve) as a function of the gain rate $\gamma_2$ in the second ring resonator 64 (e.g., the gain ring), below and above G*, in accordance with certain embodiments described herein. The two curves are identical to the curves in FIG. 4 for values of the gain rate G below G*. In certain embodiments, for values of the gain rate G above G*, the circulating power $P_G$ remains clamped at $P_{sat}/10$, but the rotation sensitivity enhancement factor continues to increase. The dashed lower curve of FIG. 5 shows the power $P_L$ circulating in the first ring resonator 62 (e.g., the loss ring). Since the circulating power $P_G$ is constrained not to exceed $P_{sat}/10$, the rate of increase of the rotation sensitivity for values of the gain rate G larger than G* is not as fast as it is below G*. Certain embodiments in which the gain rate G is allowed to approach closer to saturation can lead to greater values of rotation sensitivity. For example, as shown in FIG. 5, at a gain of 0.49 dB (e.g., just before the coupled ring resonators start to lase at 0.5 dB), the rotation sensitivity enhancement factor is about 252, more than twice as large as for a gain rate G of G*.

Maximum Rotation Sensitivity Away from the Exceptional Point

As discussed herein, the large enhancements in rotation sensitivity achievable with the gain-coupled resonator gyroscope 10 of certain embodiments described herein is generally not due entirely to enhancement of the rotation-induced shift in the resonance frequency. Although exceptional points have drawn interest in the field of rotation sensing due to their large shift enhancements, operation at the exceptional point (e.g., where the shift is largest) is not necessarily where the rotation sensitivity is largest.

Figure 6:
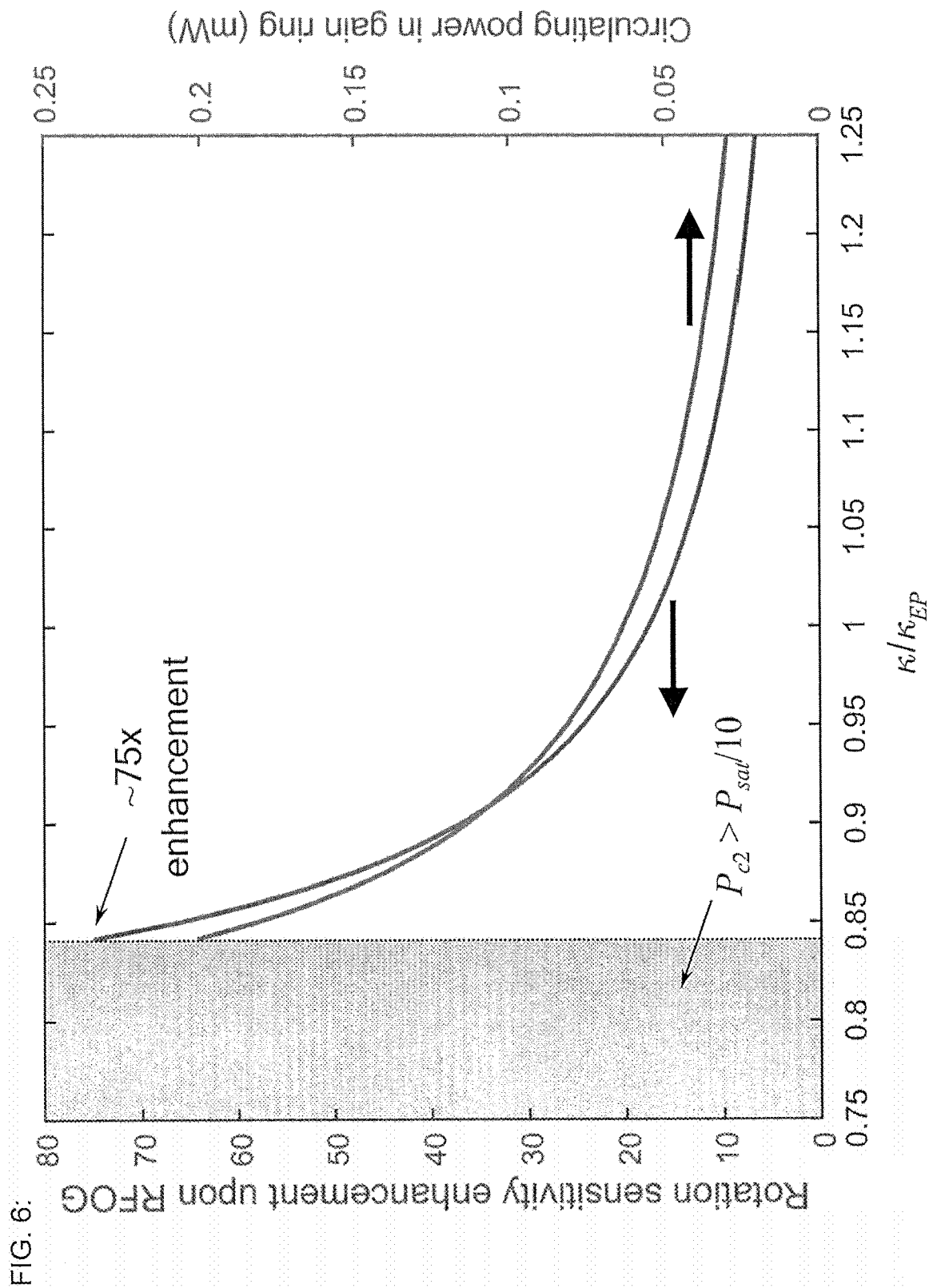
FIG. 6 plots the rotation sensitivity enhancement factor and the power $P_G$ circulating in the second ring resonator as a function of the normalized inter-ring coupling rate $\kappa/\kappa_{EP}$ for a fixed unsaturated gain G of 0.1 dB in accordance with certain embodiments described herein.

In certain embodiments, the gain-coupled resonator gyroscope 10 is operated away from the exceptional point. FIG. 6 plots the rotation sensitivity enhancement factor and the power $P_G$ circulating in the second ring resonator 64 as a function of the normalized inter-ring coupling $\kappa/\kappa_{EP}$ for a fixed unsaturated gain G of 0.1 dB in accordance with certain embodiments described herein. $P_{in}$ was held constant at 1 μW across FIG. 6. For each value of the normalized inter-ring coupling $\kappa/\kappa_{EP}$ (e.g., the ratio of the inter-ring coupling $\kappa$ to the inter-ring coupling $\kappa_{EP}$ at the exceptional point), the input coupling $\kappa_{in}$ and the frequency $\omega_p$ are optimized for the largest possible rotation sensitivity, as done in FIGS. 4 and 5. The value of the inter-ring coupling $\kappa$ was decreased only down to the value where the circulating power $P_G$ was equal to $P_{sat}/10$. The grey shaded area of FIG. 6 represents the region where reducing the inter-ring coupling $\kappa$ further may violate this condition. The two curves in FIG. 6 show that both the rotation sensitivity enhancement factor and the circulating power $P_G$ are monotonically decreasing functions of the inter-ring coupling $\kappa$. FIG. 6 demonstrates that the rotation sensitivity is not maximized at the exceptional point, even though the rotation-induced resonance frequency shift is maximum at the exceptional point. For example, the rotation sensitivity enhancement factor for values of $\kappa/\kappa_{EP}<1$ is larger than for $\kappa/\kappa_{EP}=1$. As $\kappa/\kappa_{EP}$ is decreased, the circulating power $P_G$ grows and the rotation sensitivity increases too. The rotation sensitivity follows the magnitude of the circulating power $P_G$ (e.g., number of recirculations) much more than it follows the magnitude of the rotation-induced resonance frequency shift. As shown in FIG. 6, the rotation sensitivity enhancement factor at the boundary of the grey shaded region (e.g., at $\kappa/\kappa_{EP}=0.84$) achieved in certain embodiments is about 75 (e.g., about 4 times greater than the rotation sensitivity achieved at the exceptional point $\kappa/\kappa_{EP}=1$). This value of the maximum rotation sensitivity enhancement factor is lower than that in FIG. 4 only because the gain G is lower (e.g., 0.1 dB per round trip in FIG. 6 versus 0.2136 dB per round trim in FIG. 4). In certain embodiments, decreasing the normalized inter-ring coupling $\kappa/\kappa_{EP}$ into the shaded area further increases the rotation sensitivity.

Figure 7:
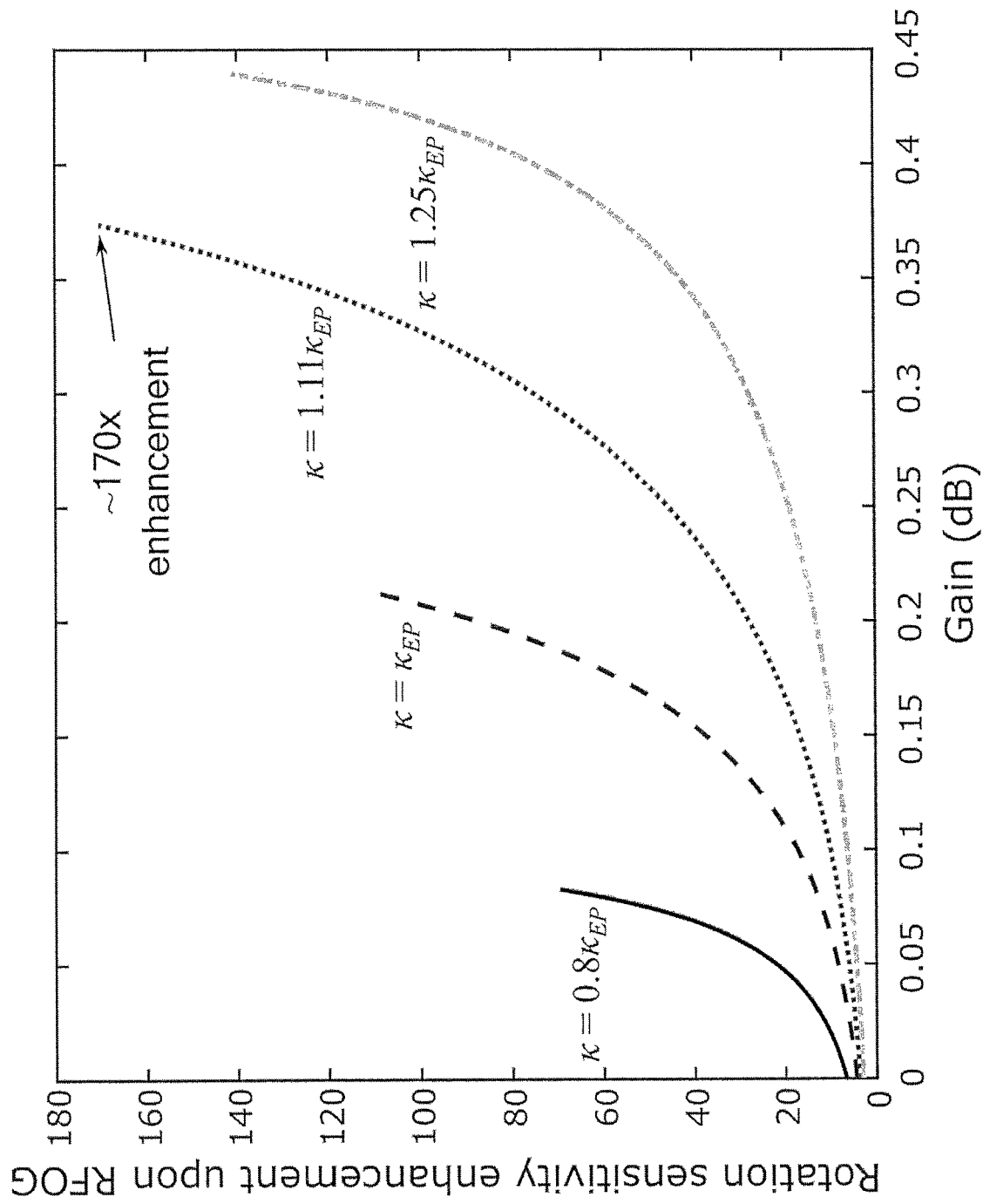
FIG. 7 plots the rotation sensitivity enhancement factor as a function of the gain G from 0 to G* for several values of the normalized inter-ring coupling rate $\kappa/\kappa_{EP}$ in accordance with certain embodiments described herein.

Global Maximum of Rotation Sensitivity in Unsaturated Gain-Coupled Resonator Gyroscope FIG. 4 demonstrates that using a larger gain rate G allows for a larger rotation sensitivity and a larger circulating power $P_G$. FIG. 6 demonstrates that using a smaller normalized inter-ring coupling $\kappa/\kappa_{EP}$ also yields a larger rotation sensitivity and a larger circulating power $P_G$ (upon optimization). Both FIG. 4 and FIG. 6 were calculated with a limit placed on the circulating power $P_G$ (e.g., 0.2 mW for $P_{sat}=2$ mW). FIG. 7 plots the rotation sensitivity enhancement factor as a function of the gain rate G from 0 to G* for several values of the normalized inter-ring coupling $\kappa/\kappa_{EP}$ in accordance with certain embodiments described herein.

FIG. 7 provides information regarding the optimal combination of the normalized inter-ring coupling $\kappa/\kappa_{EP}$ and the gain rate G jointly to maximize the rotation sensitivity, while still subject to the condition of $P_G<P_{sat}/10$ (with $P_{in}$ held constant at 1 μW) during the optimization of the input coupling $\kappa_{in}$ and the frequency $\omega_p$. For each value of the ratio $\kappa/\kappa_{EP}$, the optimized rotation sensitivity enhancement factor increases monotonically with increasing gain rate G. The right-most end point of each curve of FIG. 7 corresponds to the gain rate G=G*, where $P_G=P_{sat}/10$. As the ratio $\kappa/\kappa_{EP}$ is increased, the maximum of the rotation sensitivity enhancement factor first increases, up to $\kappa/\kappa_{EP}=1.11$, then decreases. As shown in FIG. 7, the optimum value of the ratio $\kappa/\kappa_{EP}$ is 1.11, for which $G_2^*=0.3738$ dB, and at this gain the rotation sensitivity enhancement factor is about 170 (e.g., the rotation sensitivity of the gain-coupled resonator gyroscope is about 170 times that of an RFOG with a ring resonator of same size and loss). Each of the curves of FIG. 7 can be extended past the point of the gain rate G=G* by imposing also $P_G=P_{sat}/10$, which will produce an even higher rotation sensitivity enhancement. In certain embodiments, the gain-coupled resonator gyroscope 10 is operated with a ratio $\kappa/\kappa_{EP}$ in a range of zero to one, in a range of 1.05 to 1.35, in an range of 1.08 to 1.25, in a range of 1.08 to 1.22, or in a range of 1.09 to 1.22. For example, $\kappa/\kappa_{EP}<1$ can give a large rotational sensitivity if the input laser frequency is detuned from $\omega^*$ (e.g., in the case where $\omega_p$ is detuned further from resonance than $\omega^*$ so as to decrease the circulating power at $\omega_p$). For example, the rotation sensitivity enhancement factor of about 170 when the gain-coupled resonator gyroscope is operated with a ratio $\kappa/\kappa_{EP}=1.11$ at the gain rate $G=G^*$ (equal to about 0.37 dB) is about 1.5 times the rotation sensitivity enhancement factor of about 112 when the gain-coupled resonator gyroscope 10 is operated with a ratio $\kappa/\kappa_{EP}=1.00$ at the gain rate $G=G^*$ (equal to about 0.21 dB). In contrast to other systems that have been disclosed to be operated at the exceptional point (e.g., as close to the exceptional point as practical), certain embodiments described herein are operated to avoid the exceptional point. In addition, by operating certain such embodiments away from the exceptional point, rotational sensitivities can be achieved that are significantly larger (e.g., by 20%, by 30%, by 40%, by 50%, or by more than 50%) than when operated at the exceptional point.

In certain embodiments, the gyroscope 10 is not operated with the rotation-induced resonance frequency shift at a maximum (e.g., at the exceptional point). Instead, as described herein, the gyroscope 10 of certain embodiments is operated away from the exceptional point (e.g., where the rotation-induced resonance frequency shift is not maximized).

As shown in FIG. 7, in certain embodiments, the maximum rotation sensitivity does not occur when the gain-coupled resonator gyroscope 10 is operated at the exceptional point (e.g., $\kappa/\kappa_{EP}=1$), which further supports the observation that the enhanced rotation-induced shift in the resonance frequency achieved by the gain-coupled resonator gyroscope 10 of certain embodiments when operated at the exceptional point is not the primary cause of the large enhancement in the rotation sensitivity. An additional factor in the large rotation sensitivity enhancement is the large enhancement in the circulating power $P_G$. For example, while all the plots in FIG. 7 satisfy the condition of $P_G=P_{sat}/10$ at their respective end points (where the rotation sensitivity enhancement factor is largest), the maximum rotation sensitivity enhancement factor still varies greatly from plot to plot. The dependency on the circulating power $P_L$ in the first (loss) ring resonator 54 also does not explain this variation in the rotation sensitivity enhancement factor as a function of the inter-ring coupling $\kappa$.

Figure 8:
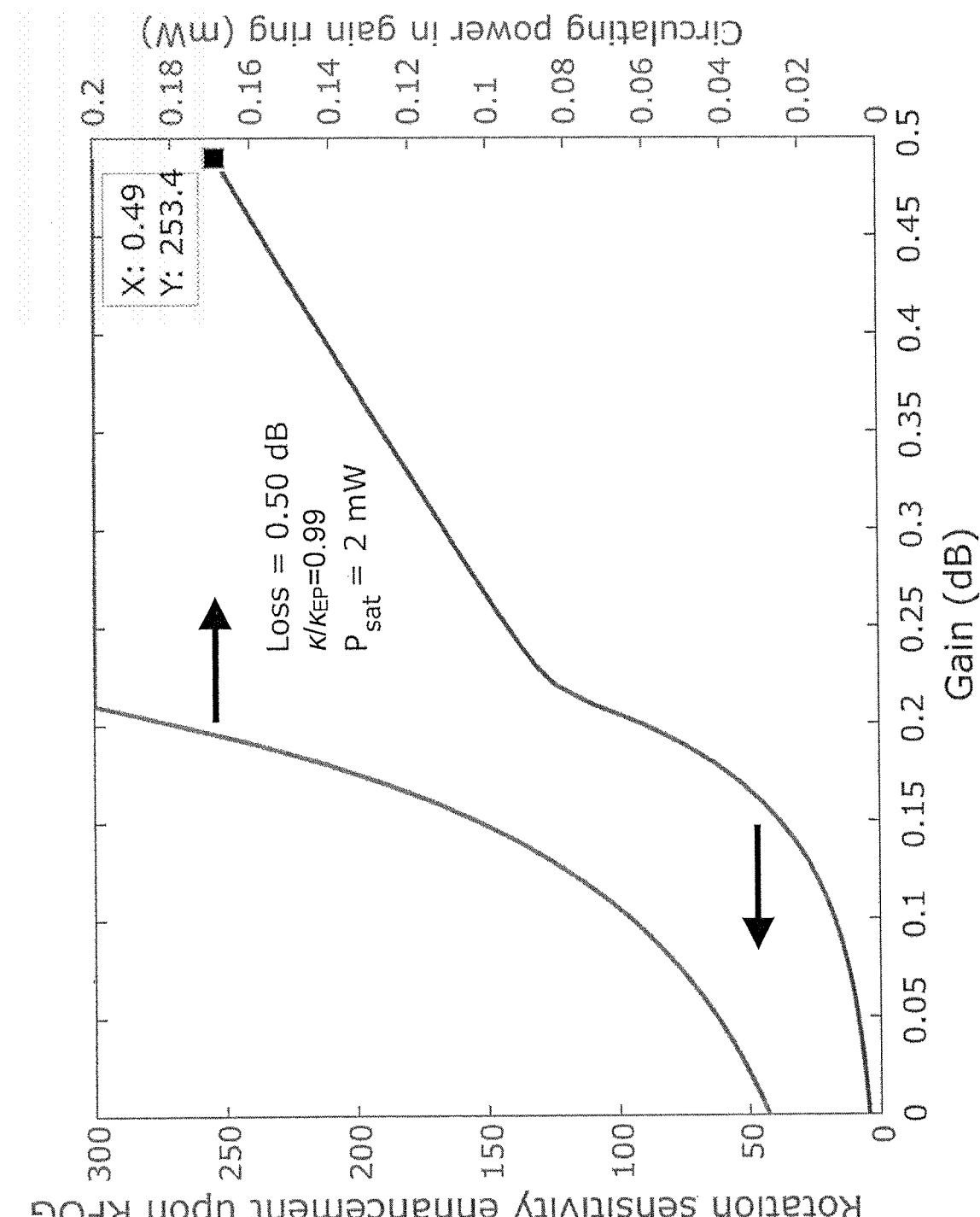
FIG. 8 plots the optimized rotation sensitivity enhancement factor and the power $P_G$ circulating in the second ring resonator as a function of the gain G in the second ring resonator, below and above G* for a ratio $\kappa/\kappa_{EP}$=0.99, in accordance with certain embodiments described herein.
Figure 9:
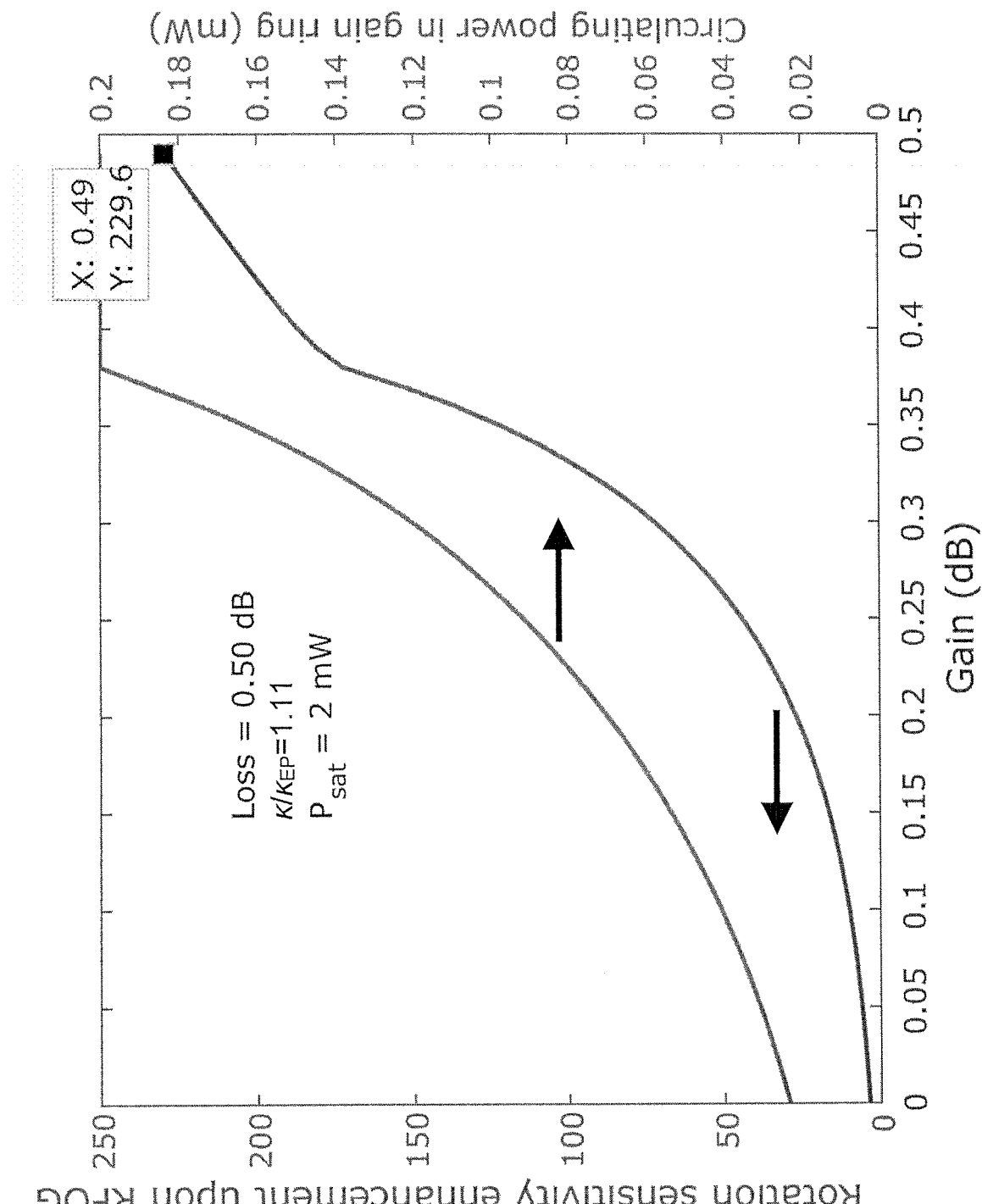
FIG. 9 plots the optimized rotation sensitivity enhancement factor and the power $P_G$ circulating in the second ring resonator as a function of the gain G in the second ring resonator, below and above G* for a ratio $\kappa/\kappa_{EP}$=1.11, in accordance with certain embodiments described herein.

FIG. 8 plots the optimized rotation sensitivity enhancement factor and the power $P_G$ circulating in the second ring resonator 64 as a function of the gain rate G in the second ring resonator 64, below and above $G^*$ for a ratio $\kappa/\kappa_{EP}=0.99$, in accordance with certain embodiments described herein. FIG. 9 plots the optimized rotation sensitivity enhancement factor and the power $P_G$ circulating in the second ring resonator 64 as a function of the gain rate G in the second ring resonator 64, below and above $G^*$ for a ratio $\kappa/\kappa_{EP}=1.11$, in accordance with certain embodiments described herein. FIGS. 8 and 9 can be compared to FIG. 5, which plots the optimized rotation sensitivity enhancement factor and the circulating power $P_G$ as a function of the gain rate G, below and above $G^*$ at the exceptional point (a ratio $\kappa/\kappa_{EP}=1$).

The trends shown in FIG. 8 are similar to those in FIG. 5, except that with the reduced ratio $\kappa/\kappa_{EP}$ in FIG. 8, the maximum rotation sensitivity enhancement is slightly larger (253.4 versus 251.8). In FIG. 9, the maximum rotation sensitivity enhancement is reduced compared to that in FIG. 5, down to 229.6. These trends are consistent with FIG. 6, which indicated that a lower ratio $\kappa/\kappa_{EP}$ produces a higher rotation sensitivity. By operating the gyroscope at $\omega^*$, then the ratio of $\kappa/\kappa_{EP}$ can be greater than 1, for a chosen loss of the loss ring and input power, although the optimal value of $\kappa/\kappa_{EP}$ is different for different input power and loss. However, for the same choice of loss and input power as in FIG. 7, in certain embodiments, the gyroscope 10 is not operated at $\omega^*$ since at frequencies detuned further from the resonance than $\omega^*$, the circulating power is smaller (see, FIG. 2B). By detuning sufficiently far from $\omega^*$, the circulating power can become small enough that the gain can be increased while still maintaining $P_G<P_{sat}/10$ and achieving a larger sensitivity with a $\kappa/\kappa_{EP}$ of less than 1 (see, FIGS. 5, 8, and 9). In certain embodiments, the gyroscope 10 can be operated without detuning from $\omega^*$. For example, operating away from $\omega^*$ can make the detected power much smaller, so a Pound-Drever-Hall technique (e.g., as is done with RFOGs) can be difficult, and a much larger gain may not be readily available.

Figure 10:
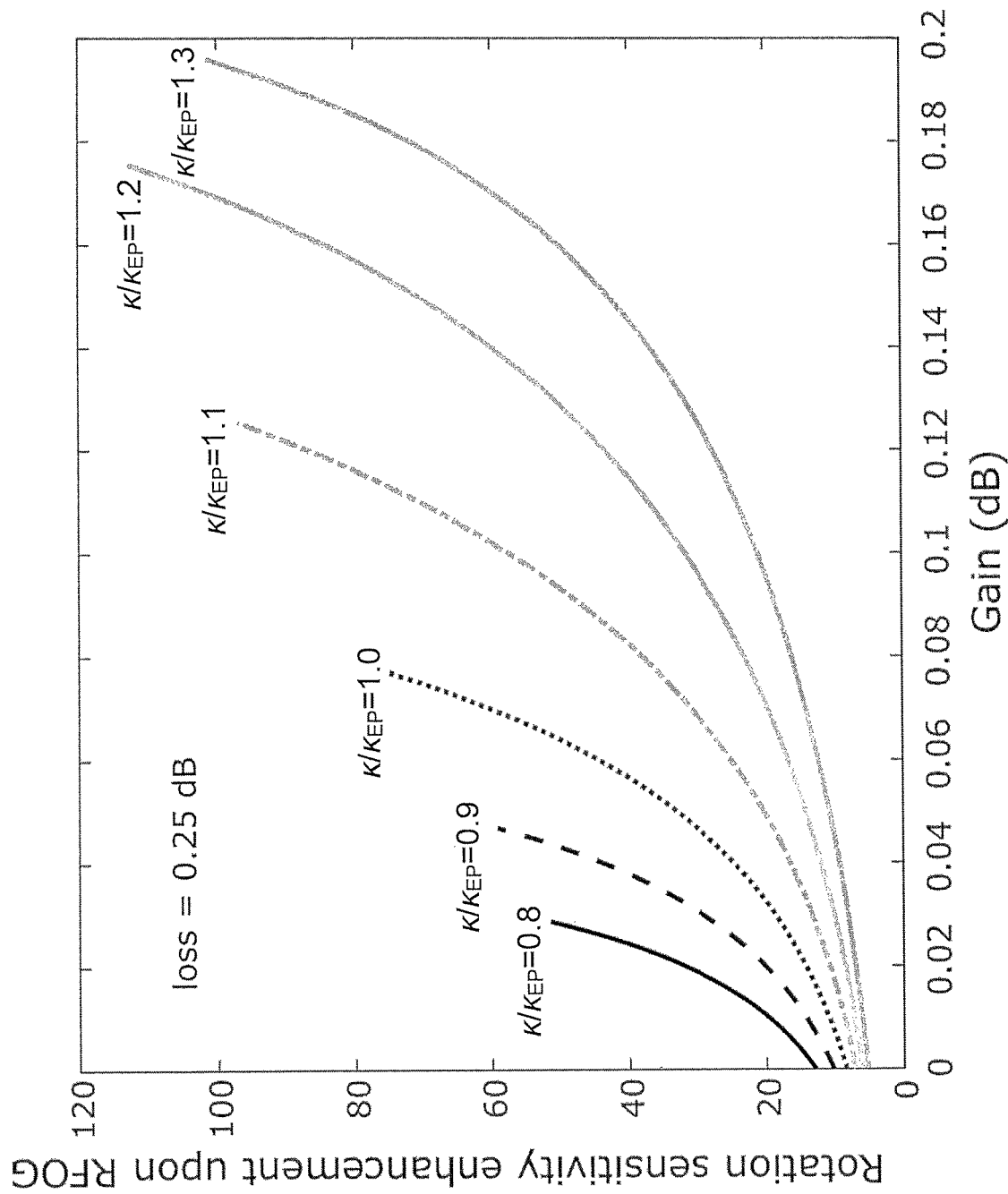
FIG. 10 plots the rotation sensitivity enhancement factor as a function of the gain G from 0 to G* for several values of the normalized inter-ring coupling rate $\kappa/\kappa_{EP}$, in accordance with certain embodiments described herein.

FIG. 10 plots the rotation sensitivity enhancement factor as a function of the gain rate G from 0 to $G^*$ for several values of the normalized inter-ring coupling $\kappa/\kappa_{EP}$, in accordance with certain embodiments described herein. Each of the curves of FIG. 10 is subject to the condition of $P_G<P_{sat}/10$ during the optimization of the input coupling $\kappa_{in}$ and the frequency $\omega_p$. FIG. 10 differs from FIG. 7 in that the loss of the first ring resonator 54 for FIG. 7 equals 0.5 dB and the loss of the first ring resonator 54 for FIG. 10 equals 0.25 dB, so FIG. 10 provides some information regarding the impact of the loss of the first ring resonator 54 (e.g., the loss ring). The curves of FIG. 10 show the same trends as do the curves of FIG. 7. The maximum rotation sensitivity of FIG. 10 does not occur at the ratio $\kappa/\kappa_{EP}=1.11$, but at $\kappa/\kappa_{EP}=1.20$, while the maximum value of the rotation sensitivity enhancement factor at the right-most end point of each curve of FIG. 10 is lower than in FIG. 7. For example, the maximum rotation sensitivity enhancement factor for $\kappa/\kappa_{EP}=1.20$ for a loss of 0.25 dB in FIG. 10 is about 112, as compared to about 170 for a loss of 0.5 dB in FIG. 7.

Unfolded and Folded Configurations with Second Ring Resonator Having the Loss Rate In the following section, discussion of various aspects of the unfolded configuration with the second ring resonator 64 having a loss rate (see, e.g., FIGS. 1C and 1D) is provided.

Principle of Operation

To fully benefit from the $\sqrt{\Omega}$ dependence, the gyroscope 10 can utilize a readout system that accurately measures the extremely small shifts in resonance frequencies of the gyroscope 10. However, most high-accuracy passive resonant gyroscopes do not measure a frequency shift, but measure the change in the output power resulting from this frequency shift. This principle can be used in the two example gyroscopes 10 of FIGS. 1C and 1D. The gyroscope 10 can be probed with an optical signal 32 at frequency $\omega_p$ provided by a coherent light source 30 (e.g., probe laser). A rotation-induced frequency splitting of the signal circulating in the coupled rings 54, 64 can change the power $P_{out}$ transmitted at the output of the optical waveguide 20 and detected by the detector 40 of the gyroscope 10. The rotation rate can be inferred from a measurement of this change of the output power.

The sensitivity of the gyroscope 10 of FIGS. 1C and 1D can be calculated by deriving an expression for the dependence of the transmission of the gyroscope 10 on the rotation rate (or $\varepsilon_s$), then taking its derivative with respect to $\Omega$, as prescribed by Eq. (8a). For both configurations of FIGS. 1C and 1D, the transmission at the probe laser frequency can be obtained by solving Eq. (1) in the steady-state limit The transmission is given by:

$$T = 1 - \frac{2\kappa_{in}(\kappa^2 L/8 - G_\infty L^2/8 - G_\infty \Delta_2^2/2)}{(\kappa^2/4 - \kappa_{t,LG}^2/4 - \Delta_1 \Delta_2)^2 + [L\Delta_1/2 - (G + \kappa_{in})\Delta_2/2]^2} \quad (19)$$

where $G_\infty$ is the steady-state value of G (e.g., long enough after the probe laser 30 has been turned on that the power circulating in the two ring resonators 54, 64 has reached equilibrium), which is given by $G=G_0/(1+P_G/P_{sat})$ and the steady-state value of $P_G$, which is:

$$P_G = \frac{\kappa_{in}(L^2/4 + \Delta_2^2)c/(n_{eff} 2\pi R)}{(\kappa^2/4 - \kappa_{t,LG}^2/4 - \Delta_1 \Delta_2)^2 + [L\Delta_1/2 - (G_\infty + \kappa_{in})\Delta_2/2]^2} \quad (20)$$

Eqs. (19) and (20) only hold below lasing threshold, which is the case when Eq. (10b) is satisfied.

Simulations of the performance of the example gyroscopes 10 of FIGS. 1C and 1D provided below were carried out assuming the following parameter values for the gyroscope structure: R=5 mm, and $n_{eff}$=1.44, a loss of 0.5 dB per round-trip, and $\omega_1=\omega_2=\omega_0$. The input power was selected to be $P_{in}$=0.2 µW, a value selected to be just large enough to be able to safely assume that all gain saturation occurs due to the signal and none from the amplified spontaneous emission. A larger $P_{in}$ can be used, but more gain depletion can occur, which can reduce the sensitivity.

Figure 11:
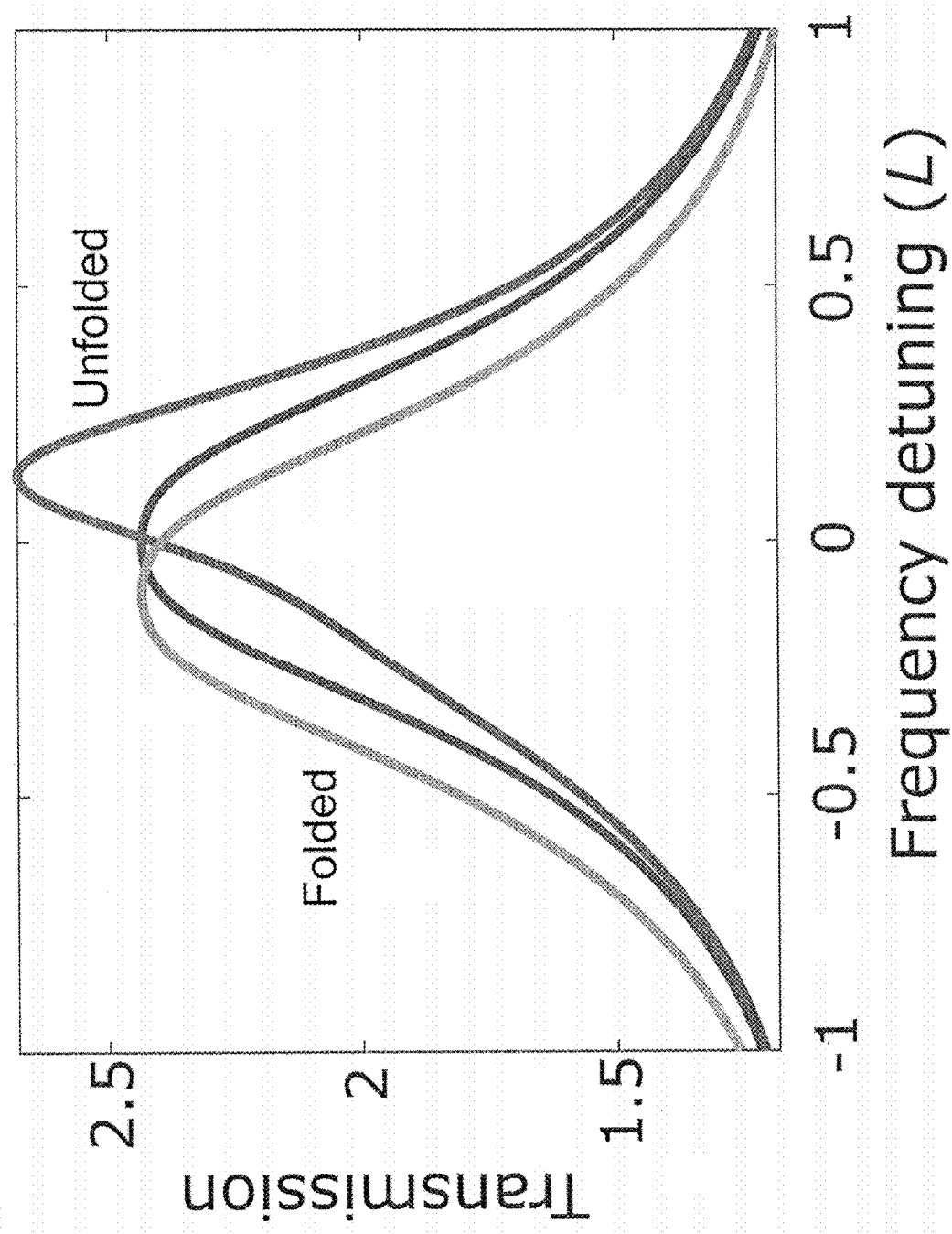
FIG. 11 illustrates a rotation-induced change of the transmission spectrum at the EP in accordance with certain embodiments described herein.

FIG. 11 illustrates a rotation-induced change of the transmission spectrum at the EP in accordance with certain embodiments described herein. The input power was 50 nW to ensure that saturation is negligible, and $G_\infty \approx G_0$. Under zero rotation, there is one degenerate resonance at $\omega_0$ (middle curve centered at zero detuning). For the unfolded configuration (e.g., FIG. 1C), upon the ring resonators 54, 64 being rotated at a rate that gives a small perturbation ($\varepsilon_s$=3.8 MHz) in FIG. 11, two mechanisms cause the spectrum to change, namely the resonance splits, and the linewidths of the two split resonances change. These combined effects result in a shift, and a clear distortion of the spectrum (right-most curve in FIG. 11). In particular, the resonances split into $\omega_0 \pm \sqrt{\kappa_{EP}\varepsilon_s}$, and the two linewidths change to $(L+\kappa_{in}-G_\infty)/2 \pm \sqrt{\kappa_{EP}\varepsilon_s}$ (e.g., one resonance becomes narrower and the other becomes broader) which explains the distortion seen in FIG. 11.

The left-most curve in FIG. 11 shows the spectrum of the same resonance in the folded configuration (e.g., FIG. 1D) for all the same parameter values except that the rotation rate is 10 times higher (e.g., $\varepsilon_s$=38 MHz). For this configuration, there is no splitting of the resonance, and no distortion. The transmission spectrum is just shifted (e.g., translated in frequency) due to the gyroscope 10 not being pushed away from its EP (see Eq. (6b)). Further simulations show that there is no enhancement in the frequency shift compared to a single ring resonator gyroscope. Thus, to induce a similar shift in the peak frequency of the spectrum as in the unfolded configuration, the rotation rate is 10 times larger in the folded configuration.

Figure of Merit for EP Gyroscopes

A useful figure of merit for a gyroscope 10 can be its minimum detectable rotation rate $\Omega_{min}$, which is defined as the smallest $\Omega$ that causes a change in detected power large enough to be measurable. The minimum detectable output power change can be equal to the readout system's noise power $P_{noise}$. Therefore, using Eq. (8a) with $\delta P_{out}=P_{noise}$, the minimum detectable rotation rate can be expressed as:

$$\Omega_{min} = P_{noise}/SP_{in} \quad (21)$$

The smallest (e.g., best) possible $\Omega_{min}$ achievable after optimization of all free parameters of a new gyroscope architecture can be compared to the smallest possible $\Omega_{min}$ achievable with a single-ring gyroscope of equal radius and loss. In general, the optimization of $\Omega_{min}$ is complicated and lacks universality because the noise comprises several sources of noise, each of which may depend on the choice of physical components used in the gyroscope (e.g., the RIN or the laser-frequency noise, which depends on the choice of probe laser). Furthermore, some noise contributions (e.g., relative intensity noise or shot noise) depend on the detected power, which itself depends on the components and operating point, in particular, on the laser probe frequency of the gyroscope. The noise power $P_{noise}$ therefore in general depends on the detected power, and it can vary over orders of magnitudes depending on a multiplicity of combinations of components used in the gyroscope, making it difficult to define a standard comparison.

In certain embodiments, the gyroscope 10 can be operated very differently to optimize $\Omega_{min}$ (see Eq. (21)), depending on the dominant noise source, because the selection of the optimal device parameters, such as coupling ratios and the frequency of the probe laser 30, can affect the detected power, which can affect $P_{noise}$. Using $\Omega_{min}$ as the figure of merit to compare the coupled-ring gyroscope 10 to a single-ring gyroscope would therefore utilize modeling and optimizing many combinations of device components, which would be tedious and time consuming. It can be much more practical and informative to optimize and compare the sensitivity of the example gyroscopes of FIGS. 1C and 1D by comparing $\Omega_{min}$ in the limit where detector noise dominates because detector noise is independent of detected power. In this case, the noise is a constant, and maximizing the sensitivity is equivalent to minimizing $\Omega_{min}$. The sensitivity of the PT-symmetric coupled-ring resonator gyroscope 10 is therefore compared to the maximum possible $dT/d\varepsilon_s$ of the single-ring resonant gyroscope. The latter is obtained analytically by optimizing $dT/d\varepsilon_s$ with respect to the probe laser's frequency and the input coupling to obtain $S_{1R}=8\omega R/(3^{3/2}L_{1R}cn_{eff})$, where $L_{1R}$ is the loss rate in the ring resonator (see Terrel).

Optimized Sensitivity at the Exceptional Point

Following the general definition of the rotation sensitivity outlined in Eq. (8a), the rotation sensitivity of the PT-symmetric coupled-ring resonator gyroscope 10 can be expressed as:

$$S := \frac{dT}{d\Omega} = \left(\frac{\partial T}{\partial \varepsilon_1} \pm \frac{\partial T}{\partial \varepsilon_2} + \frac{\partial T}{\partial G}\left(\frac{dG}{d\varepsilon_1} \pm \frac{dG}{d\varepsilon_2}\right)\right)\frac{\omega_p R}{cn_{eff}} \quad (22)$$

where the plus sign applies to the folded configuration and the minus sign to the unfolded configuration. The first term $\partial T/\partial \varepsilon_2$ is the contribution to the sensitivity from the Sagnac phase in the second ring resonator 64, while the second term $\partial T/\partial \varepsilon_1$ is the contribution from the Sagnac phase in the first ring resonator 54. The $\partial T/\partial \varepsilon_{1,2}$ terms are analogous to the sensitivity of a passive resonator sensor, which corresponds solely to the shift in the resonance frequency induced by the Sagnac phase shift. The $\partial T/\partial G \cdot dG/d\varepsilon_{1,2}$ terms originate from and quantify the saturation-related mechanism described above, which represents a new way to sense rotation that is unique to resonators with a saturable gain. Physically, when the Sagnac phase shifts, the steady-state value of $P_G$ and the gain changes because in a saturated gain medium, the gain depends on the power that it is amplifying. When the gain changes, the transmission changes, which causes the output power to change. Exploiting this new mechanism to sense a rotation further enhances the sensitivity above and beyond improvement brought about by the loss compensation and by operation near an exceptional point. This additional rotation sensitivity term goes to zero when the gain rate is not saturated (e.g., when $G_\infty \approx G_0$).

A numerical optimization of Eq. (22) was performed for the folded and unfolded configurations of the PT-symmetric coupled-ring gyroscopes 10 of FIGS. 1C and 1D. The optimized sensitivities were normalized to the maximum possible sensitivity of the single-ring gyroscope of equal radius and loss and plotted in FIG. 12 as a function of the loss compensation $|G_0/L|$ when the gyroscope is operated at its EP. The sensitivity of each gyroscope 10 was optimized by fixing a value of $G_0$, then sweeping $\kappa_{in}$ and $\omega_p$ over a fine mesh while keeping $\kappa$ equal to $\kappa_{EP}$ at each point. The gain compression factor, $|G_\infty/G_0|$, was iteratively calculated at each point by guessing a value for $G_\infty$ and computing $P_G$ for that guess. The guessed $G_\infty$ was accepted if it and the computed $P_G$ were consistent with $G=G_0/(1+P_G/P_{sat})$. This method was computationally fast enough to perform the multi-parameter numerical optimization. The ASE was confirmed not to contribute appreciably to gain saturation at each point in FIG. 12.

Figure 12:
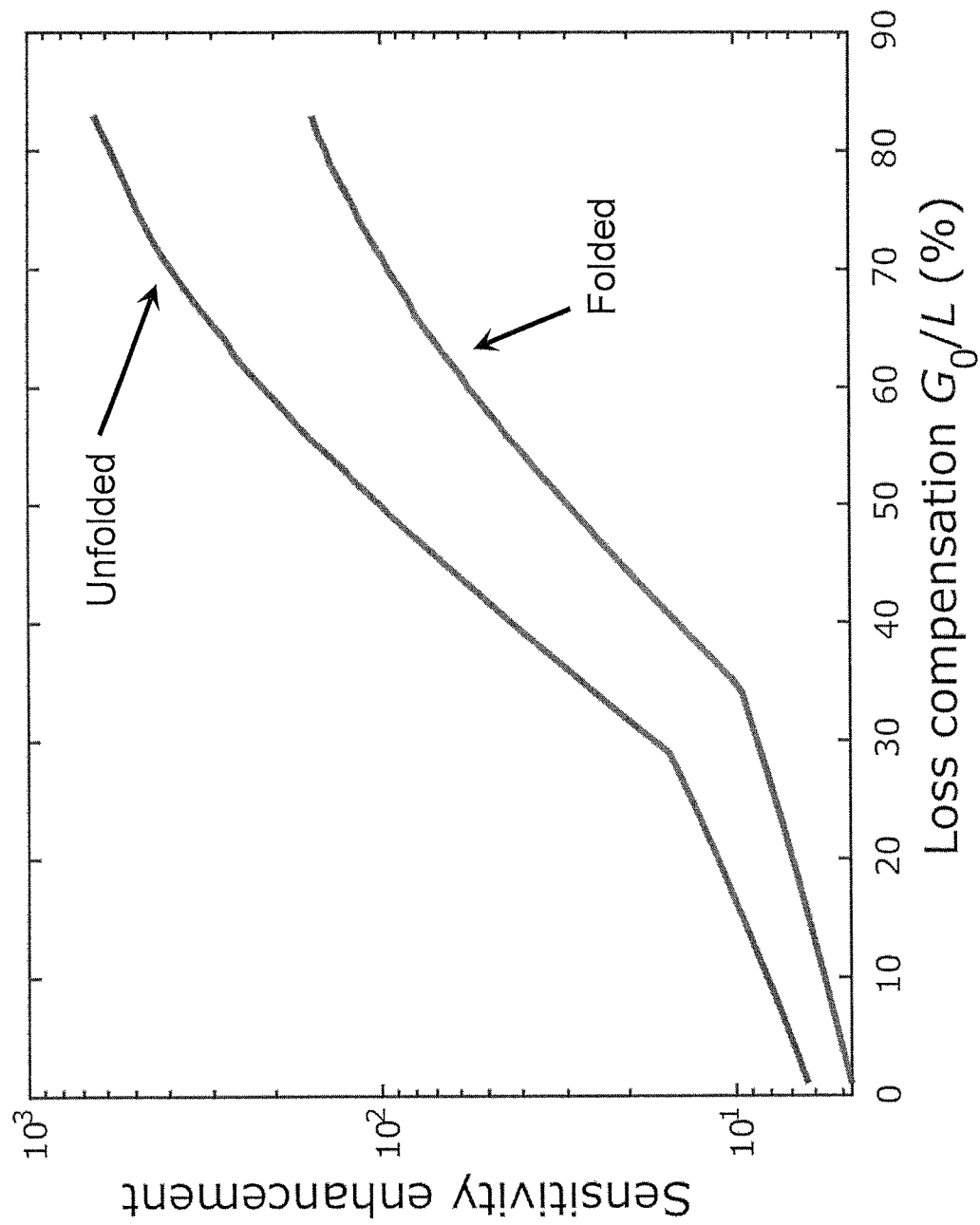
FIG. 12 illustrates a numerical optimization for the folded and unfolded configurations of the PT-symmetric coupled-ring gyroscopes of FIGS. 1C and 1D.

The curve for the unfolded configuration in FIG. 12 shows that the sensitivity of the unfolded configuration of the gyroscope 10 increases when the gain is increased. The physical reason, at least in part, is that more of the loss is compensated, the signal recirculates more times around the gain ring, and accumulates a larger Sagnac phase shift, leading to a greater change in output power. When $|G_0/L|=0.83$ for example (the rightmost point in the curve), the sensitivity of the unfolded configuration of the gyroscope 10 is larger than that of the single-ring gyroscope by a factor of 650. At this same value of $|G_0/L|=0.83$, the sensitivity enhancement of the folded configuration of the gyroscope 10 in FIG. 12 is a factor of 150, which is still large, even though the sensitivity expression does not have a term in $1/\sqrt{\Omega}$ (see Eqs. (6a) and (6b)).

The sensitivity of a single-ring gyroscope can be similarly enhanced by adding an amplifier to the resonator, but the coupled ring resonators 54, 64 are much more robust to gain fluctuations than a ring resonator with gain. For example, inserting an amplifier in a single-ring gyroscope to compensate 99% of the ring's loss will enhance the finesse by a factor of 100, and therefore the sensitivity by a factor of 100 (see Lefèvre). However, if the gain fluctuates by just 0.1%, the sensitivity will undesirably fluctuate by about 10%. If the gain fluctuates by just 1%, the ring will lase, which is also undesirable. The loss-compensated single-ring gyroscope is thus very sensitive to gain fluctuations. In contrast, the PT-symmetric coupled-ring gyroscope 10 of certain embodiments described herein is not as sensitive.

Detuning from the Exceptional Point

Figure 13:
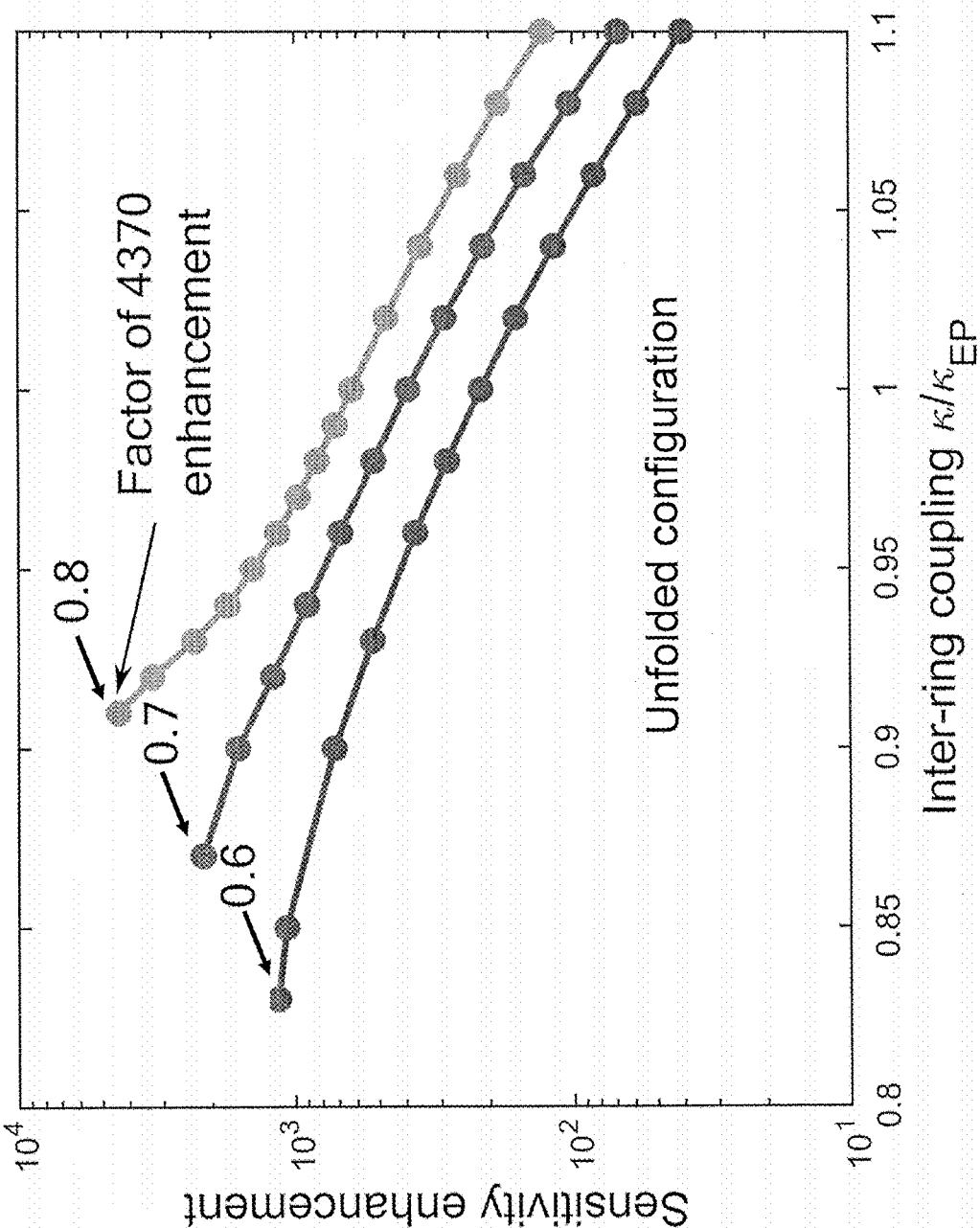
FIGS. 13 and 14 plot the improvement in rotation sensitivity of the gyroscopes in the unfolded configuration and the folded configuration, respectively, versus $\kappa/\kappa_{EP}$ with all other parameters fixed.
Figure 14:
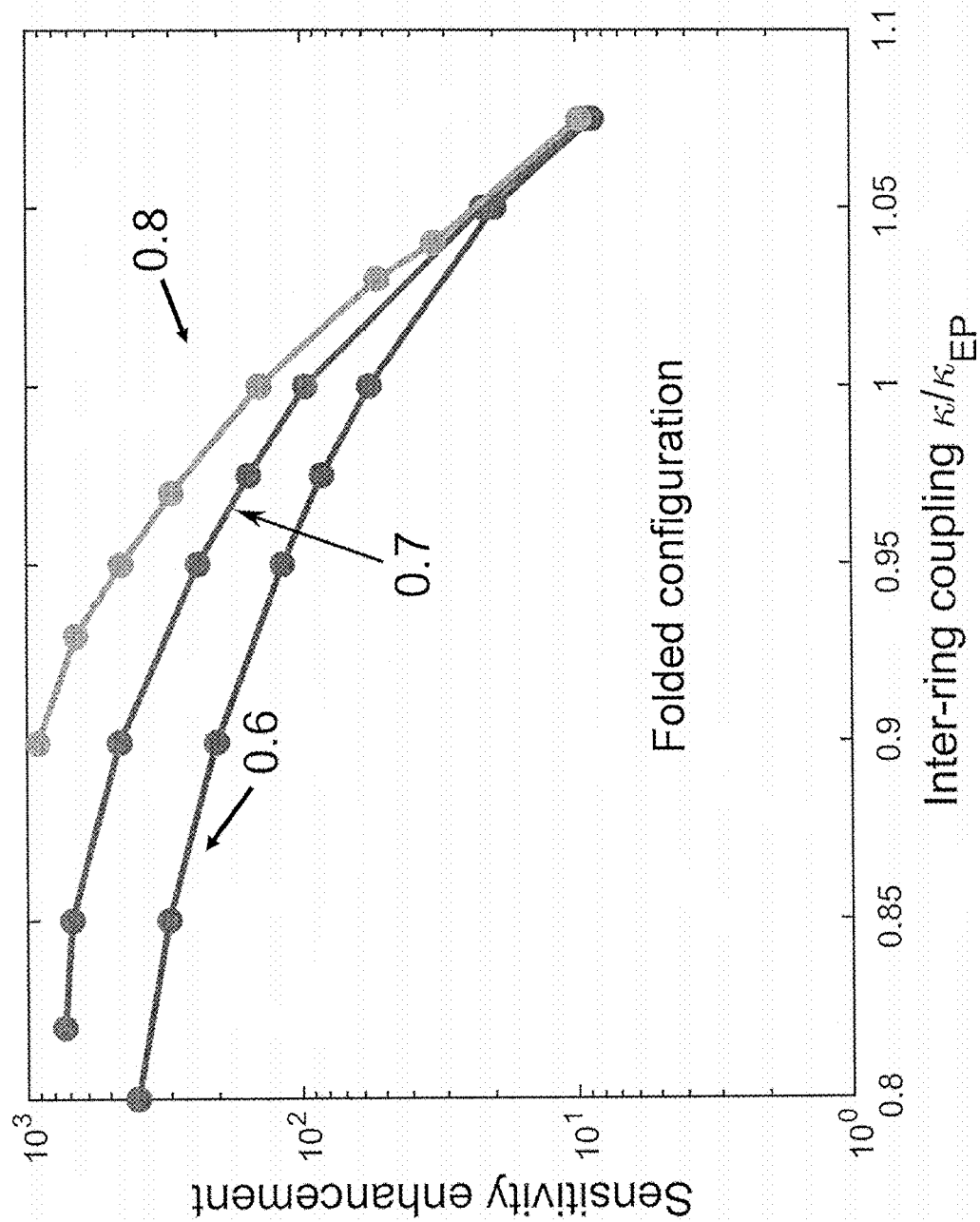

To elucidate the sensitivity enhancements of EP sensing, the rotation sensitivity of the PT-symmetric coupled-ring gyroscopes 10 were computed as the coupling of the inter-resonator coupling was detuned away from its EP value $\kappa=\kappa_{EP}$. FIGS. 13 and 14 plot the results of these simulations, namely the improvement in rotation sensitivity of the gyroscopes 10 in the unfolded configuration and the folded configuration, respectively, versus $\kappa/\kappa_{EP}$ with all other parameters fixed and for different values of the ratio $|G_0/L|$. The values of $\kappa_{in}$ and $\omega_p$ were selected to maximize the rotation sensitivity at the EP (when $\kappa/\kappa_{EP}=1$), and these values were not changed as $\kappa$ was changed (e.g., no attempt was made to optimize them for maximum sensitivity at any other point in the plot). As a result, at all points, except for at $\kappa=\kappa_{EP}$, the sensitivity improvement is not as high as it can be. In spite of this, FIGS. 13 and 14 show that the sensitivity increases monotonically as $\kappa$ is decreased below $\kappa_{EP}$, despite the fact that (i) away from the EP, the resonance shift rapidly decreases, and (ii) $\kappa_{in}$ and $\omega_p$ are no longer optimized. FIG. 13 shows that when $|G_0/L|=0.8$, the sensitivity enhancement increases from a factor of 583 at the EP to a factor of 4370, as a result of decreasing $\kappa$ from $\kappa_{EP}$ in the manner described above. This factor of 4370 improvement can be made even larger by optimizing $\kappa_{in}$ and $\omega_p$.

Highly Saturated Gain Medium

Figure 15:
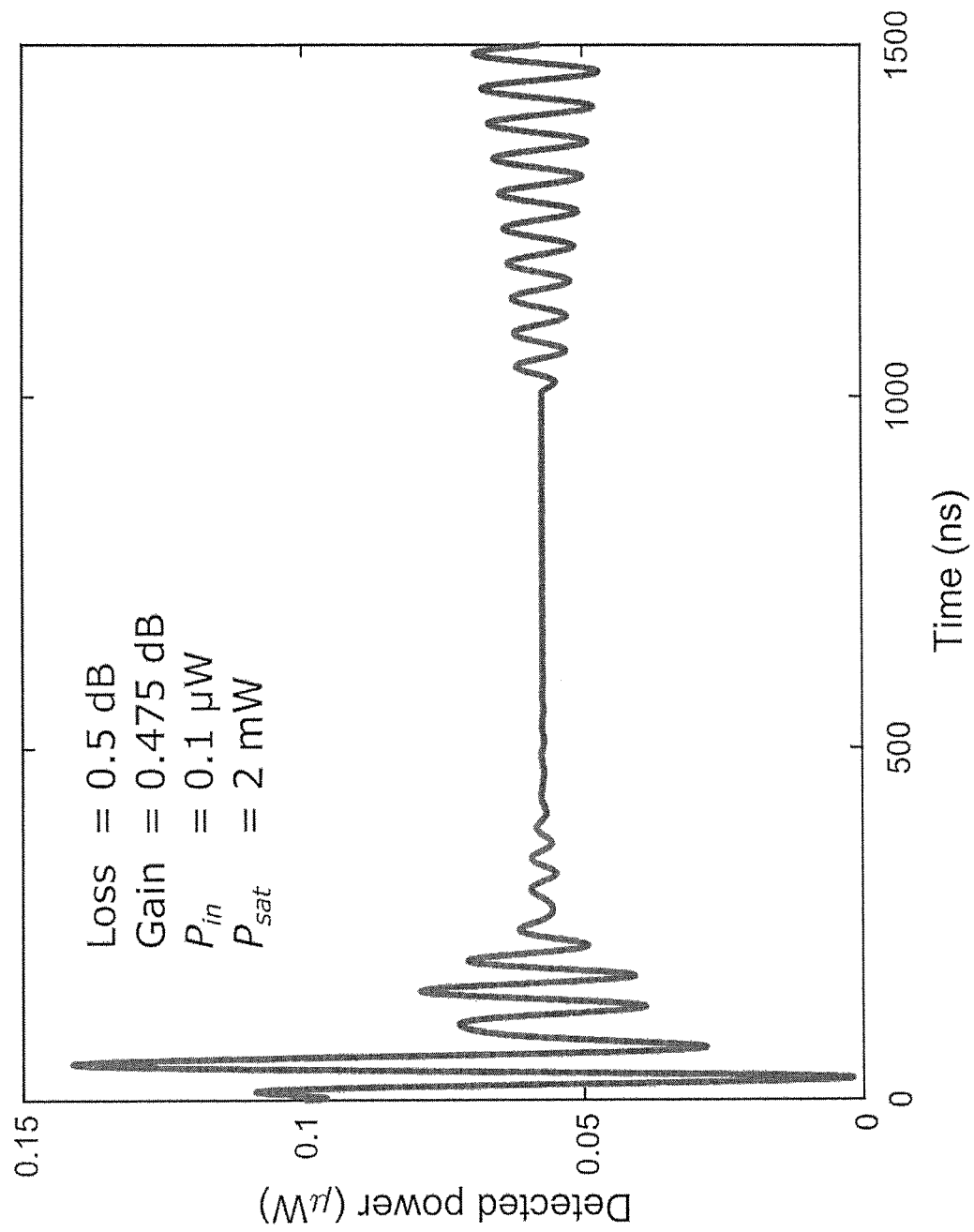
FIG. 15 illustrates the simulated instability over time in the output power of the gyroscope in the unfolded configuration of FIG. 1C.

The sensitivities of the gyroscopes 10 in the folded and unfolded configurations can be further increased when $|G_0/L|$ is greater than the maximum value of 0.83 plotted in FIG. 12, but the curves in FIG. 12 were terminated at that ratio because for $|G_0/L|>0.83$, the numerical search found unstable operating points with extremely large values of $dT/d\Omega$. This instability occurs in the output power of the gyroscope 10, as depicted in FIG. 15, where the output power of the gyroscope 10 in the unfolded configuration of FIG. 1C is simulated versus time by using a differential equation solver (ODE45 in MATLAB) to numerically solve Eq. (1). At time t=0, in FIG. 15, the gyroscope is at rest, there is no light circulating in either ring resonator 54, 64, and the probe laser 30 is abruptly turned on at a constant power of 0.1 μW, which is the value of $P_{in}$ in the entirety of the simulation. The remaining parameter values used for this simulation are given in FIG. 15.

In FIG. 15, the fields in the resonator quickly build up, causing gain saturation, which results in complicated transients in the output power as the power grows and is exchanged back and forth between the two ring resonators 54, 64. A steady-state is eventually reached at around 500 ns. At 1000 ns, a small rotation rate is applied to demonstrate that, instead of the output power quickly readjusting to a new constant value, it oscillates in time indefinitely. The simulation of FIG. 15 was continued for much longer than the 1500 ns at the end of the plot and the output power was confirmed to continue oscillating, although the magnitude of the oscillation converged to a constant value at time t=3700 ns.

Figure 16:
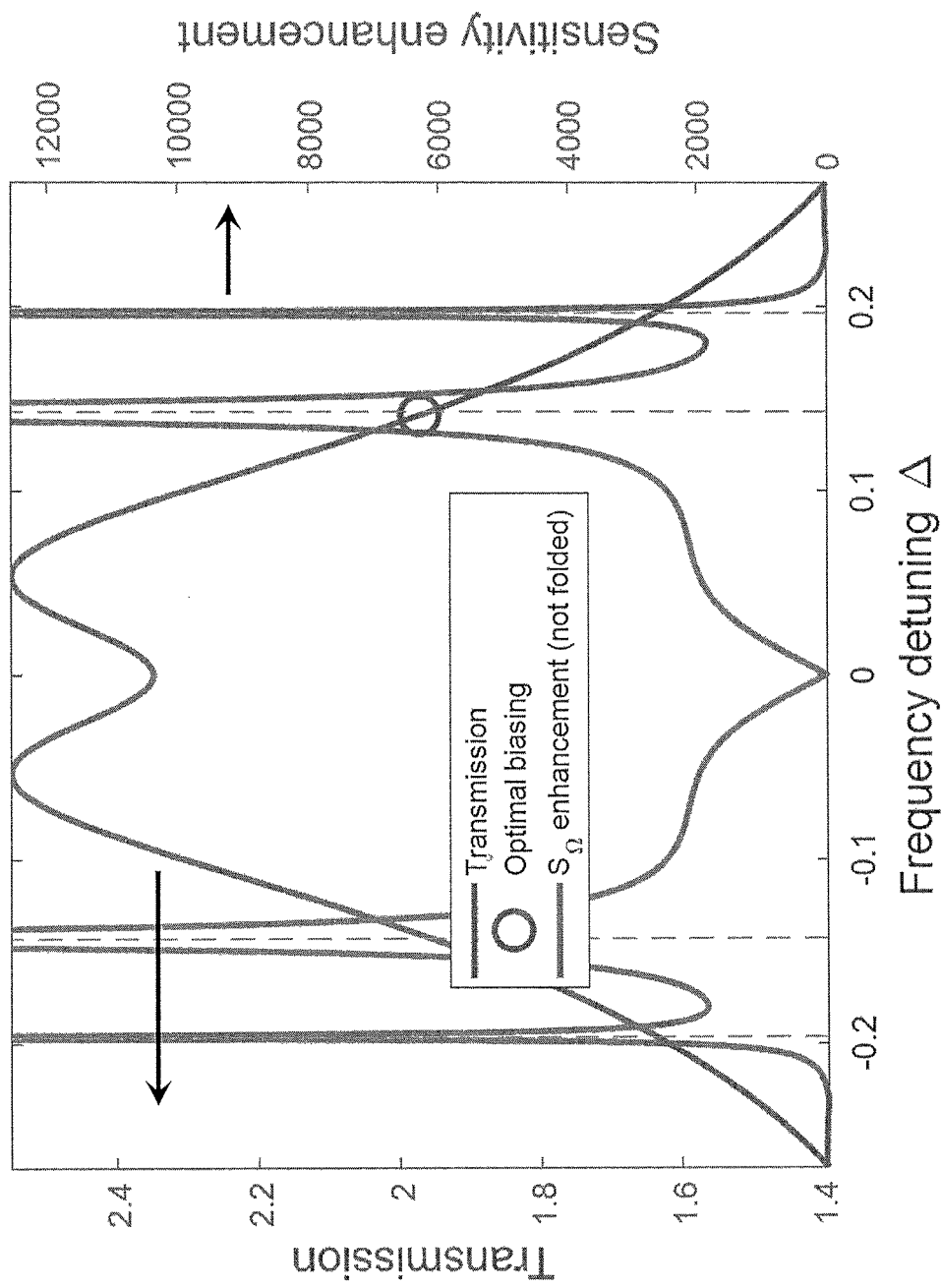
FIG. 16 plots the enhancement of $dT/d\Omega$ over the single-ring gyroscope for the gyroscope in the unfolded configuration versus the detuning a $\omega_p-\omega_0$ of the laser frequency with respect to the resonance frequency $\omega_0$ of the two ring resonators at rest.

These instabilities coincide with extremely large values of $dT/d\Omega$ that can even become infinite. FIG. 16 plots the enhancement of $dT/d\Omega$ over the single-ring gyroscope for the gyroscope 10 in the unfolded configuration versus the detuning $\omega_p-\omega_0$ of the laser frequency with respect to the (identical) resonance frequency $\omega_0$ of the two ring resonators 54, 64 at rest. There are two laser frequencies on either side of the resonance frequency where $dT/d\Omega$ diverges to infinity. Numerical simulations confirm that in these narrow regions of laser frequencies where $dT/d\Omega$ is very large, the circulating powers and the output power never reach a steady state.

Loss Dependence of Sensitivity

Figure 17:
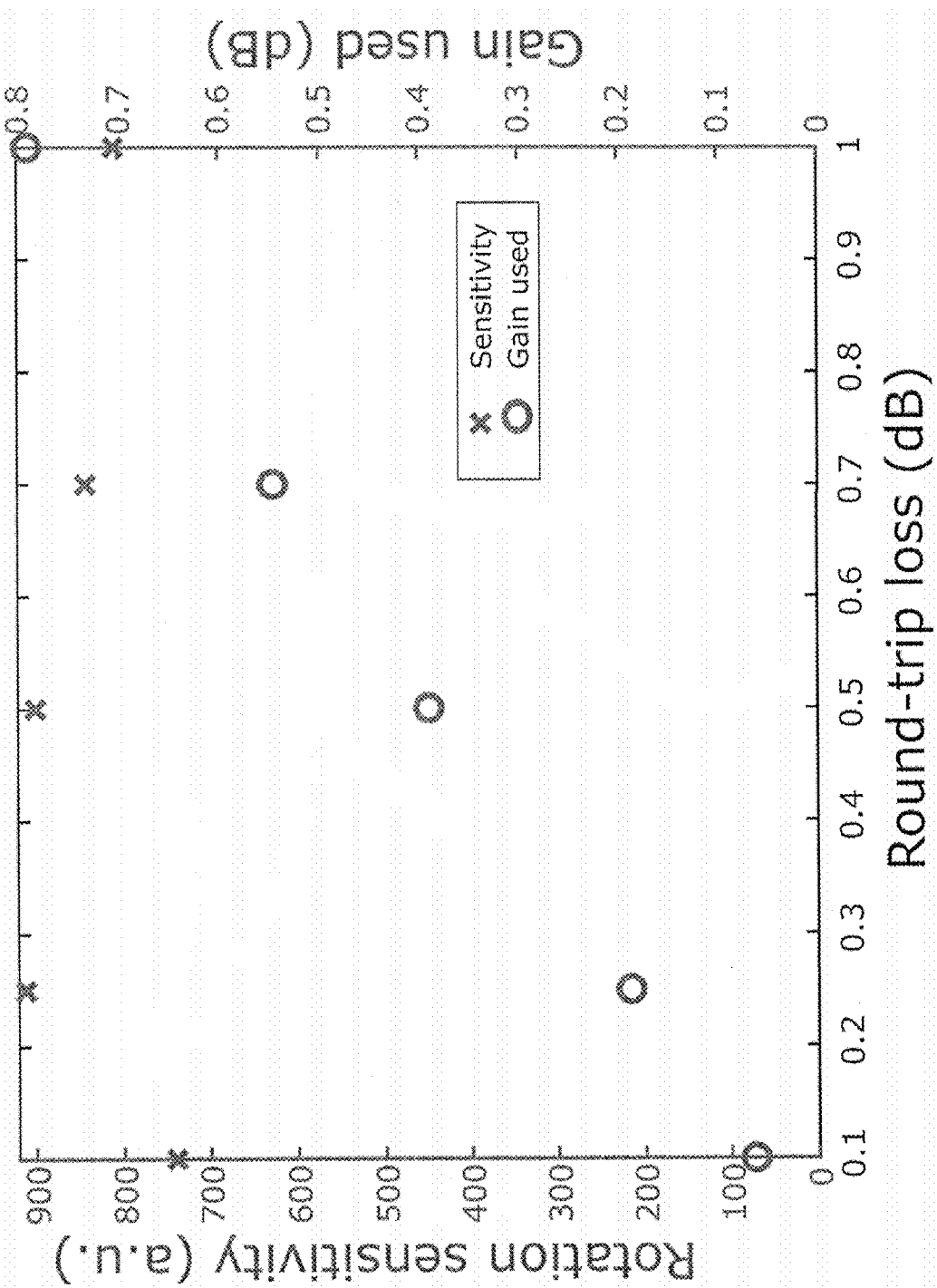
FIG. 17 plots the optimized rotation sensitivity at the EP of the gyroscope of the unfolded configuration versus the loss ring's round-trip loss (shown by crosses) and the gain to achieve this sensitivity (shown by circles).

FIG. 17 plots the optimized rotation sensitivity at the EP of the gyroscope 10 of the unfolded configuration versus the loss ring's round-trip loss (shown by crosses). The rotation sensitivity was optimized by performing a numerical search to optimize $\kappa_{in}$ and $\omega_p$ at each value of the loss in the plot, and $P_{in}$ was held constant at 0.2 µW. The gain to achieve this sensitivity is also plotted in FIG. 17 (shown by circles). This gain was selected to be as large as possible, thereby maximizing the sensitivity, before the gyroscope loses stability. As shown in FIG. 17, the absolute value of the sensitivity does not strongly depend on the loss. However, when the loss is larger, more gain can be used to compensate the loss and thus achieve peak rotation sensitivity.

Figure 18:
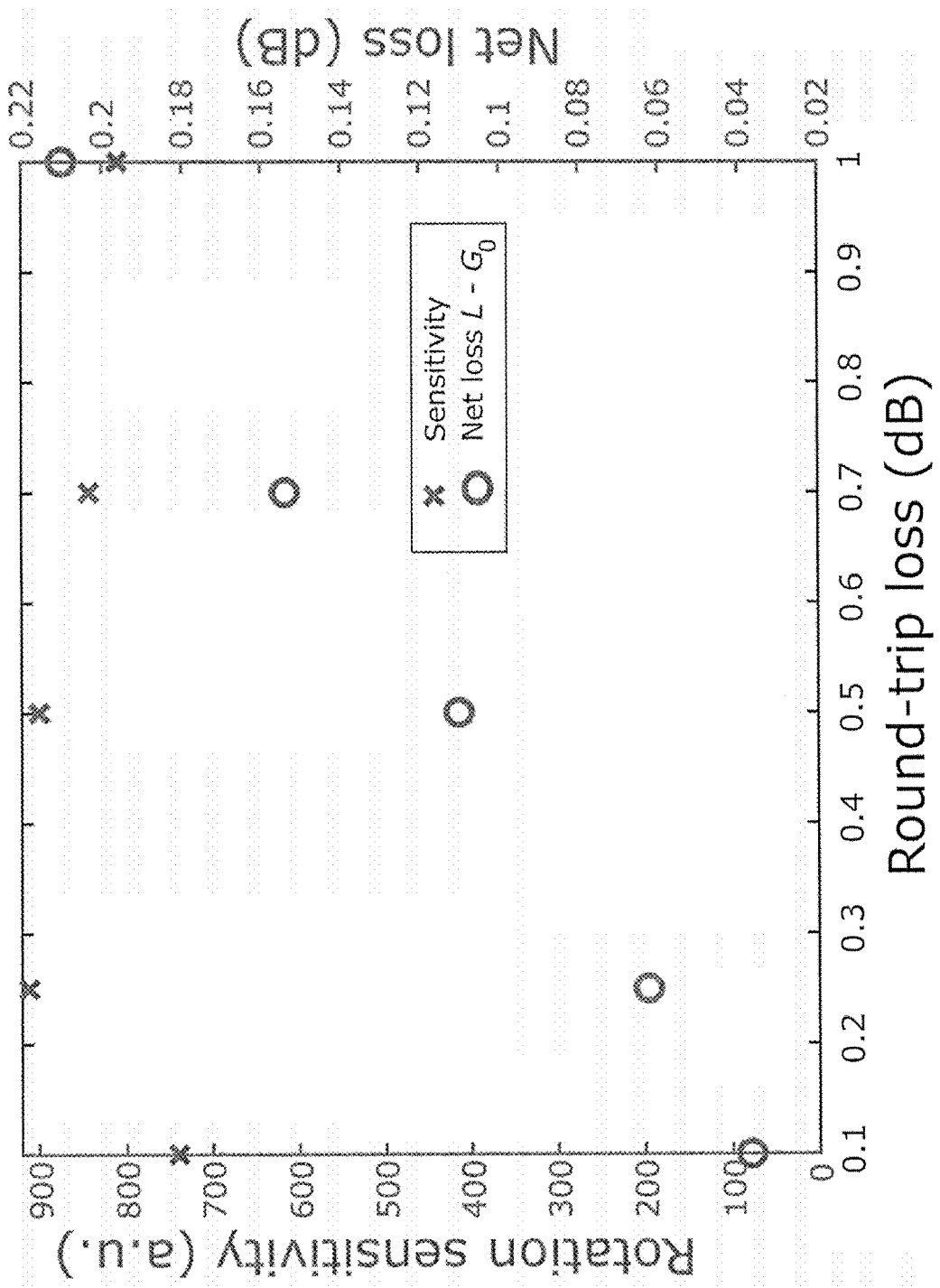
FIG. 18 plots the absolute sensitivity at the exceptional point of the gyroscope of the unfolded configuration (shown by crosses) versus the loss and the net loss at each point (shown by circles).

The sensitivity dependence plotted in FIG. 18 is the same as in FIG. 17, with the only difference between the two figures being the quantity in the right vertical axis. In FIG. 18, this quantity is the net loss, $L-G_0$. As the loss in the loss ring is increased, the net loss that maximizes the sensitivity increases.

Various configurations have been described above. Although this invention has been described with reference to these specific configurations, the descriptions are intended to be illustrative of the invention and are not intended to be limiting. Various modifications and applications may occur to those skilled in the art without departing from the true spirit and scope of the invention. Thus, for example, in any method or process disclosed herein, the acts or operations making up the method/process may be performed in any suitable sequence and are not necessarily limited to any particular disclosed sequence. Features or elements from various embodiments and examples discussed above may be combined with one another to produce alternative configurations compatible with embodiments disclosed herein. Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

What is claimed is:

1. A gyroscope comprising:
   at least one optical waveguide comprising a first portion, a second portion, and a third portion, the second portion between the first portion and the third portion;
   at least one light source in optical communication with the first portion of the at least one optical waveguide;
   a first optical resonator in optical communication with the second portion of the at least one optical waveguide, the first optical resonator having an input power coupling rate $\kappa_{in}$ with the second portion of the at least one optical waveguide and having a loss rate L;
   a second optical resonator in optical communication with the first optical resonator with an inter-resonator power coupling rate κ and having a gain rate G, the at least one optical waveguide, the first optical resonator, and the second optical resonator configured to be below lasing threshold; and
   at least one optical detector in optical communication with the third portion of the at least one optical waveguide, the at least one optical waveguide configured to receive, from the at least one light source, probe light having an input power $P_{in}$ at a frequency $\omega_p$, the at least one optical waveguide further configured to transmit at least a portion of the received probe light having an output power $P_{out}$ to the at least one optical detector.

2. The gyroscope of claim 1, wherein the at least one light source comprises a laser.

3. The gyroscope of claim 1, wherein the first optical resonator comprises a loss ring.

4. The gyroscope of claim 1, wherein the loss rate L is an optical power loss rate for the probe light propagating around the first optical resonator.

5. The gyroscope of claim 1, wherein the second optical resonator comprises a gain ring.

6. The gyroscope of claim 1, wherein the gain rate G is an optical power gain rate for probe light propagating around the second optical resonator.

7. The gyroscope of claim 1, wherein a ratio $\kappa/\kappa_{EP}$ of the inter-resonator field power coupling rate κ to an exceptional-point inter-resonator power coupling rate $\kappa_{EP}$ is in a range of greater than 0.75 and less than 0.99 and the exceptional-point inter-resonator power coupling rate $\kappa_{EP}$ equals $(L+\kappa_{in}+G)/2$.

8. The gyroscope of claim 1, wherein a ratio $\kappa/\kappa_{EP}$ of the inter-resonator field power coupling rate κ to an exceptional-point inter-resonator power coupling rate $\kappa_{EP}$ is in a range of greater than 1.01 and less than 1.35 and the exceptional-point inter-resonator power coupling rate $\kappa_{EP}$ equals $(L+\kappa_{in}+G)/2$.

9. The gyroscope of claim 1, wherein a ratio $\kappa/\kappa_{EP}$ of the inter-resonator field power coupling rate κ to an exceptional-point inter-resonator power coupling rate $\kappa_{EP}$ in a range of greater than 0.75 and less than 1.35 and the exceptional-point inter-resonator power coupling rate $\kappa_{EP}$ equals $(L+\kappa_{in}+G)/2$.

10. A method of operating a gyroscope, the method comprising:
    providing a gyroscope comprising:
       at least one optical waveguide comprising a first portion, a second portion, and a third portion, the second portion between the first portion and the third portion;
       at least one light source in optical communication with the first portion of the at least one optical waveguide;
       a first optical resonator in optical communication with the second portion of the at least one optical waveguide, the first optical resonator having an input coupling rate $\kappa_{in}$ with the second portion of the at least one optical waveguide;
       a second optical resonator in optical communication with the first optical resonator with an inter-resonator coupling rate κ, the at least one optical waveguide, the first optical resonator, and the second optical resonator configured to be below lasing threshold; and
       at least one optical detector in optical communication with the third portion of the at least one optical waveguide, the at least one optical waveguide configured to receive, from the at least one light source, light having an input power $P_{in}$ at a frequency $\omega_p$, the at least one optical waveguide further configured to transmit at least a portion of the light having an output power $P_{out}$ to the at least one optical detector; and
    operating the gyroscope with a ratio $\kappa/\kappa_{EP}$ of the inter-resonator coupling rate κ to an exceptional-point inter-resonator coupling rate $\kappa_{EP}$ in a range of greater than 0.75 and less than 1.35.

11. The method of claim 10, wherein the first optical resonator has a loss rate L, the second optical resonator has a gain rate G, and the exceptional-point inter-resonator coupling rate $\kappa_{EP}$ equals $(L+\kappa_{in}+G)/2$.

12. The method of claim 10, wherein the first optical resonator has a gain rate G, the second optical resonator has a loss rate L, and the exceptional-point inter-resonator coupling rate $\kappa_{EP}$ equals $|L-\kappa_{in}+G|/2$.

13. The method of claim 10, wherein the first optical resonator comprises a first ring resonator and the second optical resonator comprises a second ring resonator, wherein light circulates in the first ring resonator in a first direction and circulates in the second ring resonator in a second direction substantially the same as the first direction.

14. The method of claim 10, wherein the first optical resonator comprises a first ring resonator and the second optical resonator comprises a second ring resonator, wherein light circulates in the first ring resonator in a first direction and circulates in the second ring resonator in a second direction substantially opposite to the first direction.

15. A gyroscope comprising:
   at least one optical waveguide comprising a first portion, a second portion, and a third portion, the second portion between the first portion and the third portion;
   at least one light source in optical communication with the first portion of the at least one optical waveguide;
   a first optical resonator in optical communication with the second portion of the at least one optical waveguide, the first optical resonator having an input power coupling rate $\kappa_{in}$ with the second portion of the at least one optical waveguide; and
   a second optical resonator in optical communication with the first optical resonator with an inter-resonator power coupling rate $\kappa$, one of the first optical resonator and the second optical resonator having a power loss rate L greater than zero and the other of the first optical resonator and the second optical resonator having a power gain rate G greater than zero, the at least one optical waveguide, the first optical resonator, and the second optical resonator configured to be below lasing threshold; and
   at least one optical detector in optical communication with the third portion of the at least one optical waveguide, the at least one optical waveguide configured to receive, from the at least one light source, light having an input power $P_{in}$ at a frequency $\omega_p$, the at least one optical waveguide further configured to transmit at least a portion of the light having an output power $P_{out}$ to the at least one optical detector.

16. The gyroscope of claim 15, wherein the first optical resonator has a power loss rate L, the second optical resonator has a power gain rate G, and a ratio $\kappa/\kappa_{EP}$ of the inter-resonator power coupling rate $\kappa$ to an exceptional-point inter-resonator power coupling rate $\kappa_{EP}$ is in a range of greater than 0.75 and less than 1.35, wherein the exceptional point inter-resonator power coupling rate $\kappa_{EP}$ equals $(L+\kappa_{in}+G)/2$.

17. The gyroscope of claim 15, wherein the first optical resonator has a power gain rate G, the second optical resonator has a power loss rate L, and a ratio $\kappa/\kappa_{EP}$ of the inter-resonator power coupling rate $\kappa$ to an exceptional-point inter-resonator power coupling rate $\kappa_{EP}$ is in a range of greater than 0.75 and less than 1.35, wherein the exceptional-point inter-resonator field power coupling rate $\kappa_{EP}$ equals $|L-\kappa_{in}+G|/2$.

18. The gyroscope of claim 15, wherein the first optical resonator comprises a first ring resonator and the second optical resonator comprises a second ring resonator, wherein the first ring resonator is configured to have light circulate in the first ring resonator in a first direction and the second ring resonator is configured to have light circulate in the second ring resonator in a second direction substantially the same as the first direction.

19. The gyroscope of claim 15, wherein the first optical resonator comprises a first ring resonator and the second optical resonator comprises a second ring resonator, wherein the first ring resonator is configured to have light circulate in the first ring resonator in a first direction and the second ring resonator is configured to have light circulate in the second ring resonator in a second direction substantially opposite to the first direction.

* * * * *

UNITED STATES PATENT AND TRADEMARK OFFICE
CERTIFICATE OF CORRECTION

PATENT NO. : 11,131,547 B2
APPLICATION NO. : 16/746696
DATED : September 28, 2021
INVENTOR(S) : Michel J. F. Digonnet et al.

Page 1 of 1

It is certified that error appears in the above-identified patent and that said Letters Patent is hereby corrected as shown below:

In the Specification

In Column 6, Line 33, delete "x" and insert --κ--.

In Column 13, Line 24 (Approx.), delete "78 $_{EP}$" and insert --$\kappa_{EP}$--.

In Column 16, Line 55, delete "a$_{out}$" and insert --$\alpha_{out}$--.

In Column 16, Line 55, delete "a$_{in}$" and insert --$\alpha_{in}$--.

In Column 18, Lines 1-5, delete "$T = 1 - K_{in} \frac{LK^2/4 - L^2G/4 + G\Delta_2^2}{(K^2/4 - K_{t,GL}^2/4 - \Delta_1\Delta_2)^2 + [L\Delta_1/2 + (G - K_{in})\Delta_2/2]^2}$" and insert $$T = 1 - K_{in} \frac{LK^2/4 - L^2G/4 - G\Delta_2^2}{(K^2/4 - K_{t,GL}^2/4 - \Delta_1\Delta_2)^2 + [L\Delta_1/2 - (G - K_{in})\Delta_2/2]^2}$$ --.

In Column 27, Lines 7-10, delete "$T = 1 - \frac{2K_{in}(K^2L/8 - G_\infty L^2/8 - G_\infty \Delta_2^2/2)}{(K^2/4 - K_{t,LG}^2/4 - \Delta_1\Delta_2)^2 + [L\Delta_1/2 - (G + K_{in})\Delta_2/2]^2}$" and insert $$T = 1 - \frac{2K_{in}(K^2L/8 - G_\infty L^2/8 - G_\infty \Delta_2^2/2)}{(K^2/4 - K_{t,GL}^2/4 - \Delta_1\Delta_2)^2 + (L\Delta_1/2 - (G - K_{in})\Delta_2/2)^2}$$ --.

In Column 27, Lines 19-22, delete "$P_G = \frac{K_{in}(L^2/4 + \Delta_2^2)c/(n_{eff}2\pi R)}{(K^2/4 - K_{t,LG}^2/4 - \Delta_1\Delta_2)^2 + [L\Delta_1/2 - (G_\infty + K_{in})\Delta_2/2]^2}$" and insert $$P_G = \frac{K_{in}(L^2/4 + \Delta_2^2)c/(n_{eff}\pi R)}{(K^2/4 - K_{t,LG}^2/4 - \Delta_1\Delta_2)^2 + (L\Delta_1/2 - (G_\infty - K_{in})\Delta_2/2)^2}$$ --.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*